United States Patent
Li et al.

(10) Patent No.: US 9,853,802 B2
(45) Date of Patent: Dec. 26, 2017

(54) RADIO FREQUENCY CIRCUIT AND MOBILE TERMINAL

(71) Applicant: Huawei Technologies Co., Ltd., Shenzhen (CN)

(72) Inventors: Weinan Li, Shanghai (CN); Tao Liu, Shanghai (CN); Jian Liang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 14/695,553

(22) Filed: Apr. 24, 2015

(65) Prior Publication Data

US 2015/0312018 A1 Oct. 29, 2015

(30) Foreign Application Priority Data

Apr. 25, 2014 (CN) .......................... 2014 1 0169867

(51) Int. Cl.
*H04B 7/005* (2006.01)
*H04L 5/14* (2006.01)
(Continued)

(52) U.S. Cl.
CPC ......... *H04L 5/1415* (2013.01); *H04B 1/0057* (2013.01); *H04B 1/0458* (2013.01);
(Continued)

(58) Field of Classification Search
None
See application file for complete search history.

(56) References Cited

U.S. PATENT DOCUMENTS 4,380,822 A 4/1983 Broton
6,496,708 B1 * 12/2002 Chan ...................... H03H 7/461
330/126
(Continued)

FOREIGN PATENT DOCUMENTS

CN 1339183 A 3/2002
CN 1669228 A 9/2005
(Continued)

OTHER PUBLICATIONS

Partial English Translation and Abstract of Chinese Patent Application No. CN101282127A, dated Jul. 1, 2015, 15 pages.
(Continued)

*Primary Examiner* — Mohammad Anwar
*Assistant Examiner* — Angel Brockman
(74) *Attorney, Agent, or Firm* — Conley Rose, P.C.

(57) ABSTRACT

A radio frequency circuit. In the circuit, a first directional coupler receives a second transmit signal, uses a part of the second transmit signal as a third transmit signal, directly sends the third transmit signal to a first port of a circulator, and obtains a first coupling signal from the second transmit signal; the circulator outputs the third transmit signal through a second port; an impedance tuner transmits the third transmit signal to an antenna port and transmits, to the second port of the circulator, a first input signal from the antenna port; the circulator inputs the first input signal to a second directional coupler through a third port; the second directional coupler obtains a second coupling signal from the first input signal; and a controller adjusts impedance of the impedance tuner according to the first coupling signal and the second coupling signal.

20 Claims, 13 Drawing Sheets

(51) Int. Cl.
  *H04B 1/04* (2006.01)
  *H04B 1/18* (2006.01)
  *H04B 1/00* (2006.01)
  *H04L 25/02* (2006.01)
  *H04W 36/00* (2009.01)

(52) U.S. Cl.
  CPC ............. *H04B 1/18* (2013.01); *H04L 25/028* (2013.01); *H04W 36/0055* (2013.01)

(56) References Cited

U.S. PATENT DOCUMENTS

| | | | |
|---|---|---|---|
| 7,212,789 B2 | 5/2007 | Kuffner | |
| 9,048,805 B2* | 6/2015 | Granger-Jones | H04B 1/525 |
| 2002/0101301 A1* | 8/2002 | Chiang | H01P 1/185 |
| | | | 333/164 |
| 2005/0042989 A1 | 2/2005 | Ho | |
| 2005/0281229 A1* | 12/2005 | Girola | H04L 1/0003 |
| | | | 370/335 |
| 2006/0025088 A1 | 2/2006 | Pietig et al. | |
| 2008/0080404 A1* | 4/2008 | Kodim | H04B 1/0458 |
| | | | 370/277 |
| 2011/0299437 A1 | 12/2011 | Mikhemar et al. | |
| 2013/0002370 A1 | 1/2013 | Adler et al. | |
| 2013/0176912 A1* | 7/2013 | Khlat | H04B 1/525 |
| | | | 370/277 |
| 2014/0092795 A1* | 4/2014 | Granger-Jones | H04L 5/08 |
| | | | 370/297 |

FOREIGN PATENT DOCUMENTS

| | | |
|---|---|---|
| CN | 101282127 A | 10/2008 |
| CN | 102163987 A | 8/2011 |
| CN | 103380573 A | 10/2013 |
| TW | 200509561 A | 3/2005 |

OTHER PUBLICATIONS

Gu, Q., et al., "Direct Calculation Method for Matching Network Dynamic Control," 2012, 3 pages.

Luis, J, R., D., et al., "Tunable Duplexing Antenna System for Wireless Transceivers," IEEE Transactions on Antennas and Propagation, vol. 60, No. 11, Nov. 2012, pp. 5484-5487.

Wada, T., et al., "Tunable Isolator using Variable Capacitor for Multi-Brand System," 2013, 3 pages.

Foreign Communication From a Counterpart Application, European Application No. 15161935.0, Extended European Search Report dated Oct. 21, 2015, 6 pages.

Machine Translation and Abstract of Chinese Publication No. CN102163987, dated Aug. 24, 2011, 10 pages.

Foreign Communication From a Counterpart Application, Chinese Application No. 201410169867.X, Chinese Search Report dated Feb. 23, 2017, 2 pages.

Foreign Communication From a Counterpart Application, Chinese Application No. 201410169867.X, Chinese Office Action dated Mar. 2, 2017, 9 pages.

* cited by examiner

RADIO FREQUENCY CIRCUIT AND MOBILE TERMINAL

CROSS-REFERENCE TO RELATED APPLICATION

This application claims priority to Chinese Patent Application No. 201410169867.X, filed on Apr. 25, 2014, which is hereby incorporated by reference in its entirety.

TECHNICAL FIELD

The present invention relates to the communications field, and more specifically, to a radio frequency circuit and a mobile terminal.

BACKGROUND

In a frequency division duplexing (FDD) system, a general duplexing solution may be that, resonance filters are respectively implemented on a transmit (TX) channel and a receive (RX) channel using a surface acoustic wave (SAW)/Bulk Acoustic Wave (BAW) process, where these two filters, on one hand, are used as a TX/RX band-pass filter of a radio frequency circuit, and on the other hand, further provide TX-RX separation, and these two filters are coupled together on an antenna port using an impedance matching circuit. However, a primary defect of the foregoing duplexing solution is that, a supported band range is small, and a band is fixed and cannot be tuned, because functions of filtering and duplexing of a TX/RX channel are coupled together and both a working band of a SAW/BAW resonance filter and a working band of the impedance matching circuit are a narrow band, and if multiple modes and multiple bands need to be supported, a plurality of groups of foregoing duplexers is required, which increases cost, an area, and complexity of a radio frequency circuit. In addition, another defect of the solution is that, the solution is incompatible with a time division duplexing (TDD) system where if a TDD system needs to be further supported, a TX/RX channel needs to be connected to an antenna (ANT) using a transmitter-receiver (TR) switch, which also increases cost, an area, and complexity of a radio frequency circuit.

SUMMARY

Embodiments of the present invention provide a radio frequency circuit and a mobile terminal, which can reduce cost, an area, and complexity of a radio frequency circuit and can ensure an isolation between a receive path and a transmit path.

According to a first aspect, a radio frequency circuit is provided, including a controller and at least one duplexing module, where the duplexing module includes an impedance tuner and at least one transmitter-receiver unit, where the transmitter-receiver unit includes a circulator, at least one radio frequency transmit path, at least one radio frequency receive path, a first directional coupler, and a second directional coupler; the radio frequency transmit path is configured to receive a first transmit signal and perform filtering and amplifying processing on the first transmit signal to obtain a second transmit signal; the first directional coupler is configured to receive the second transmit signal, use a part of the second transmit signal as a third transmit signal, directly send the third transmit signal to the circulator, and obtain, by means of coupling, a first coupling signal from the second transmit signal; the circulator includes a first port, a second port, and a third port that are arranged in sequence in a circular direction of the circulator, and the circulator is configured to receive the third transmit signal through the first port and output the third transmit signal through the second port; the impedance tuner is configured to transmit, to an antenna port, the third transmit signal output from the second port of the circulator and transmit, to the second port of the circulator, a first input signal from the antenna port; the circulator is further configured to receive the first input signal through the second port and input the first input signal to the second directional coupler through the third port; the second directional coupler is configured to use a part of the first input signal as a second input signal, directly send the second input signal to the radio frequency receive path, and obtain, by means of coupling, a second coupling signal from the first input signal; and the radio frequency receive path is configured to perform filtering processing on the second input signal to obtain a third input signal; and the controller is configured to adjust impedance of the impedance tuner according to the first coupling signal and the second coupling signal, so that impedance matching is achieved on the second port of the circulator.

With reference to the first aspect, in a first possible implementation manner of the first aspect, the controller is configured to acquire impedance information of the antenna port according to the first coupling signal and the second coupling signal, and perform impedance adjustment on the impedance tuner according to the impedance information of the antenna port, so that impedance matching is achieved on the second port of the circulator, where the impedance information of the antenna port includes a standing wave ratio that is of the antenna port and obtained according to a power of the first coupling signal and a power of the second coupling signal; or the impedance information of the antenna port includes a standing wave ratio that is of the antenna port and obtained according to a power of the first coupling signal and a power of the second coupling signal, and an impedance phase angle that is of the antenna port and obtained according to relative phases of the first coupling signal and the second coupling signal.

With reference to the first possible implementation manner of the first aspect, in a second possible implementation manner of the first aspect, the controller is configured to acquire the impedance information of the antenna port according to the first coupling signal and the second coupling signal periodically and perform dynamic adjustment on the impedance of the impedance tuner according to the periodically acquired impedance information of the antenna port.

With reference to the first aspect or either of the foregoing possible implementation manners of the first aspect, in a third possible implementation manner of the first aspect, when the transmitter-receiver unit includes a plurality of the radio frequency transmit paths and a plurality of the radio frequency receive paths, the transmitter-receiver unit further includes a first switch and a second switch, where the first switch is configured to selectively transmit, to the first directional coupler, the second transmit signal output by one of the plurality of the radio frequency transmit paths; and the second switch is configured to selectively transmit, to one of the plurality of the radio frequency receive paths, the second input signal directly sent by the second directional coupler.

With reference to the first aspect or any one of the foregoing possible implementation manners of the first aspect, in a fourth possible implementation manner of the first aspect, when the circuit includes a plurality of the duplexing modules, the circuit further includes a diplexer, where the plurality of the duplexing modules is separately coupled to the antenna port using the diplexer, and the diplexer is configured to transmit, according to different bands, the first input signal to a duplexing module corresponding to a band of the first input signal.

With reference to the first aspect or any one of the foregoing possible implementation manners of the first aspect, in a fifth possible implementation manner of the first aspect, the radio frequency transmit path includes a power amplifier and a filter; and the radio frequency receive path includes a filter.

With reference to the first aspect or any one of the foregoing possible implementation manners of the first aspect, in a sixth possible implementation manner of the first aspect, the radio frequency receive path further includes a low-noise amplifier, which is configured to perform amplifying processing on a signal that is filtered by the filter of the radio frequency receive path, so as to obtain the third input signal.

According to a second aspect, a radio frequency circuit is provided, including a controller and at least one duplexing module, where the duplexing module includes an impedance tuner, a coupling unit, and at least one transmitter-receiver unit, where the transmitter-receiver unit includes a circulator, at least one radio frequency transmit path, and at least one radio frequency receive path; the radio frequency transmit path is configured to receive a first transmit signal and perform filtering and amplifying processing on the first transmit signal to obtain a second transmit signal; the circulator includes a first port, a second port, and a third port that are arranged in sequence in a circular direction of the circulator, and the circulator is configured to receive the second transmit signal through the first port and output the second transmit signal through the second port; the coupling unit is configured to receive the second transmit signal, use a part of the second transmit signal as a third transmit signal, directly send the third transmit signal to the impedance tuner, and obtain, by means of coupling, a first coupling signal from the second transmit signal; the impedance tuner is configured to transmit, to an antenna port, the third transmit signal and transmit, to the coupling unit, a first input signal from the antenna port; the coupling unit is further configured to use a part of the first input signal as a second input signal, directly send the second input signal to the circulator, and obtain, by means of coupling, a second coupling signal from the first input signal; the circulator is further configured to receive the second input signal through the second port and input the second input signal to the radio frequency receive path through the third port; and the radio frequency receive path is configured to perform filtering processing on the second input signal to obtain a third input signal; and the controller is configured to adjust impedance of the impedance tuner according to the first coupling signal and the second coupling signal, so that impedance matching is achieved on the second port of the circulator.

With reference to the second aspect, in a first possible implementation manner of the second aspect, the controller is configured to acquire impedance information of the antenna port according to the first coupling signal and the second coupling signal, and perform impedance adjustment on the impedance tuner according to the impedance information of the antenna port, so that impedance matching is achieved on the second port of the circulator, where the impedance information of the antenna port includes a standing wave ratio that is of the antenna port and obtained according to a power of the first coupling signal and a power of the second coupling signal; or the impedance information of the antenna port includes a standing wave ratio that is of the antenna port and obtained according to a power of the first coupling signal and a power of the second coupling signal, and an impedance phase angle that is of the antenna port and obtained according to relative phases of the first coupling signal and the second coupling signal.

With reference to the first possible implementation manner of the second aspect, in a second possible implementation manner of the second aspect, the controller is configured to acquire the impedance information of the antenna port according to the first coupling signal and the second coupling signal periodically and perform dynamic adjustment on the impedance of the impedance tuner according to the periodically acquired impedance information of the antenna port.

With reference to the second aspect or either of the foregoing possible implementation manners of the second aspect, in a third possible implementation manner of the second aspect, when the transmitter-receiver unit includes a plurality of the radio frequency transmit paths and a plurality of the radio frequency receive paths, the transmitter-receiver unit further includes a first switch and a second switch, where the first switch is configured to selectively transmit, to the circulator, the second transmit signal output by one of the plurality of the radio frequency transmit paths; and the second switch is configured to selectively transmit, to one of the plurality of the radio frequency receive paths, the second input signal output from the third port of the circulator.

With reference to the second aspect or any one of the foregoing possible implementation manners of the second aspect, in a fourth possible implementation manner of the second aspect, when the duplexing module includes a plurality of the transmitter-receiver units, the duplexing module further includes a third switch, and the coupling unit includes a plurality of directional couplers, where each directional coupler is separately corresponding to one transmitter-receiver unit, and the directional coupler is configured to obtain, by means of coupling, a first coupling signal from the second transmit signal output from the second port of the circulator in the transmitter-receiver unit corresponding to the directional coupler, use a part of the second transmit signal, which is output by the transmitter-receiver unit corresponding to the directional coupler, as a third transmit signal, directly send the third transmit signal to the third switch; and the third switch is configured to selectively transmit, to the impedance tuner, the third transmit signal output by one of the plurality of directional couplers; and the third switch is further configured to selectively transmit, to one of the plurality of directional couplers, the first input signal output by the impedance tuner, and the directional coupler is further configured to use a part of the first input signal as a second input signal, directly send the second input signal to the circulator of the transmitter-receiver unit corresponding to the directional coupler and obtain, by means of coupling, a second coupling signal from the first input signal.

With reference to the second aspect or any one of the foregoing first to third possible implementation manners of the second aspect, in a fifth possible implementation manner of the second aspect, when the duplexing module includes a plurality of the transmitter-receiver units, the duplexing module further includes a fourth switch; and the fourth switch is configured to selectively transmit, to the coupling unit, a second transmit signal output by one of the plurality of transmitter-receiver units; and transmit, to one of the plurality of transmitter-receiver units, the second input signal output by the coupling unit, where the coupling unit is a directional coupler.

With reference to the second aspect or any one of the foregoing possible implementation manners of the second aspect, in a sixth possible implementation manner of the second aspect, when the circuit includes the plurality of the duplexing modules, the circuit further includes a diplexer, where the plurality of the duplexing modules is separately coupled to the antenna port using the diplexer, and the diplexer is configured to transmit, according to different bands, the first input signal to a duplexing module corresponding to a band of the first input signal.

With reference to the second aspect or any one of the foregoing possible implementation manners of the second aspect, in a seventh possible implementation manner of the second aspect, the radio frequency transmit path includes a power amplifier and a filter; and the radio frequency receive path includes a filter.

With reference to the second aspect or any one of the foregoing possible implementation manners of the second aspect, in an eighth possible implementation manner of the second aspect, the radio frequency receive path further includes a low-noise amplifier, which is configured to perform amplifying processing on a signal that is filtered by the filter in the radio frequency receive path, so as to obtain the third input signal.

According to a third aspect, a mobile terminal is provided, including an antenna, and the radio frequency circuit according to the first aspect or the radio frequency circuit according to any possible implementation manner of the first aspect, or the second aspect or the radio frequency circuit according to any possible implementation manner of the second aspect, and the radio frequency circuit is coupled to an antenna port of the antenna.

With reference to the third aspect, in a first possible implementation manner of the third aspect, the mobile terminal further includes a transceiver; the transceiver is configured to transmit a first transmit signal to the radio frequency circuit; and/or receive a third input signal processed by the radio frequency circuit.

With reference to the first possible implementation manner of the third aspect, in a second possible implementation manner of the third aspect, a radio frequency receive path, a radio frequency transmit path, and a controller in the radio frequency circuit and the transceiver are integrated into a same integrated circuit using an integrated circuit process.

Because the circulator in the transmitter-receiver unit of the radio frequency circuit according to the embodiments of the present invention has a duplex function, and the radio frequency receive path and the radio frequency transmit path may have a filtering function, two functions, namely duplexing and filtering, are decoupled; in addition, because a working band of the circulator is a tunable or broadband band, a multimode and multi-frequency duplex function may be achieved, thereby reducing complexity, cost, and an area of a radio frequency circuit. A signal receive path and a signal transmit path according to the embodiment of the present invention may independently work at the same time, so that they are compatible with both TDD and FDD modes, and complexity, cost, and an area of a radio frequency circuit may be further reduced. In addition, in the embodiments of the present invention, a first coupling signal and a second coupling signal may be obtained by coupling a transmit signal and an input signal, and a controller may acquire impedance information of an antenna port according to the first coupling signal and the second coupling signal and perform impedance adjustment on the impedance tuner according to the impedance information of the antenna port, so that impedance matching may be achieved on a port that is of the circulator and connected to the antenna port, thereby ensuring an isolation of the circulator and making the isolation of the circulator keep unchanged when impedance of an antenna changes along with external environment. Therefore, an isolation between a receive path and a transmit path may be ensured.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE FDD system, an LTE TDD system, a LTE-A system or the like.

Figure 1A:
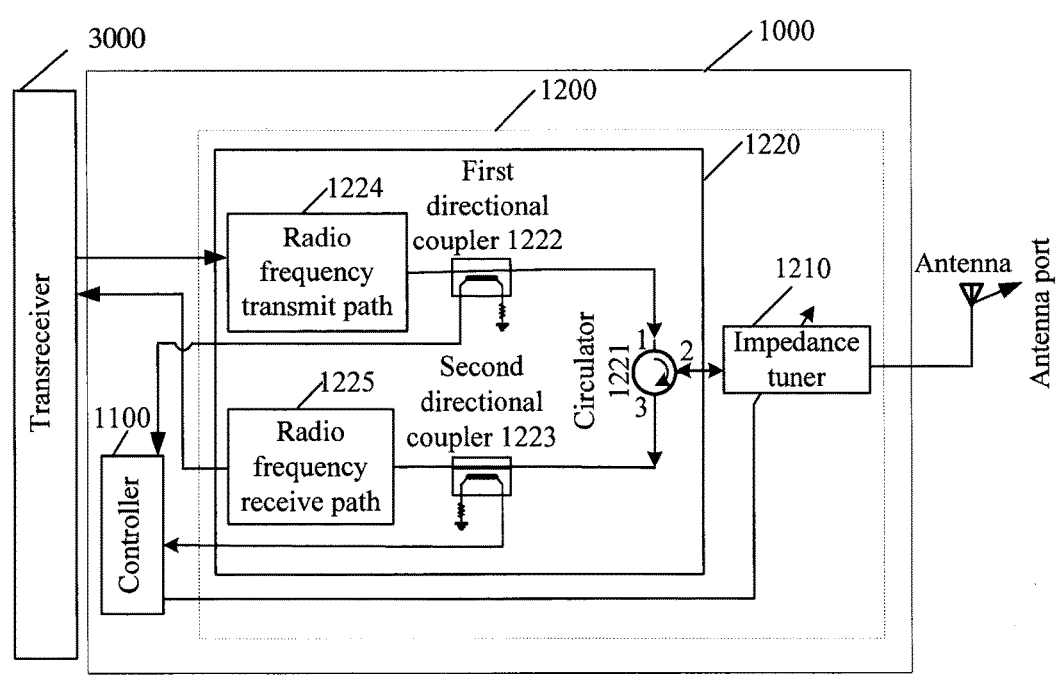
FIG. 1A and FIG. 1B are schematic block diagrams of a radio frequency circuit according to an embodiment of the present invention.
Figure 1B:
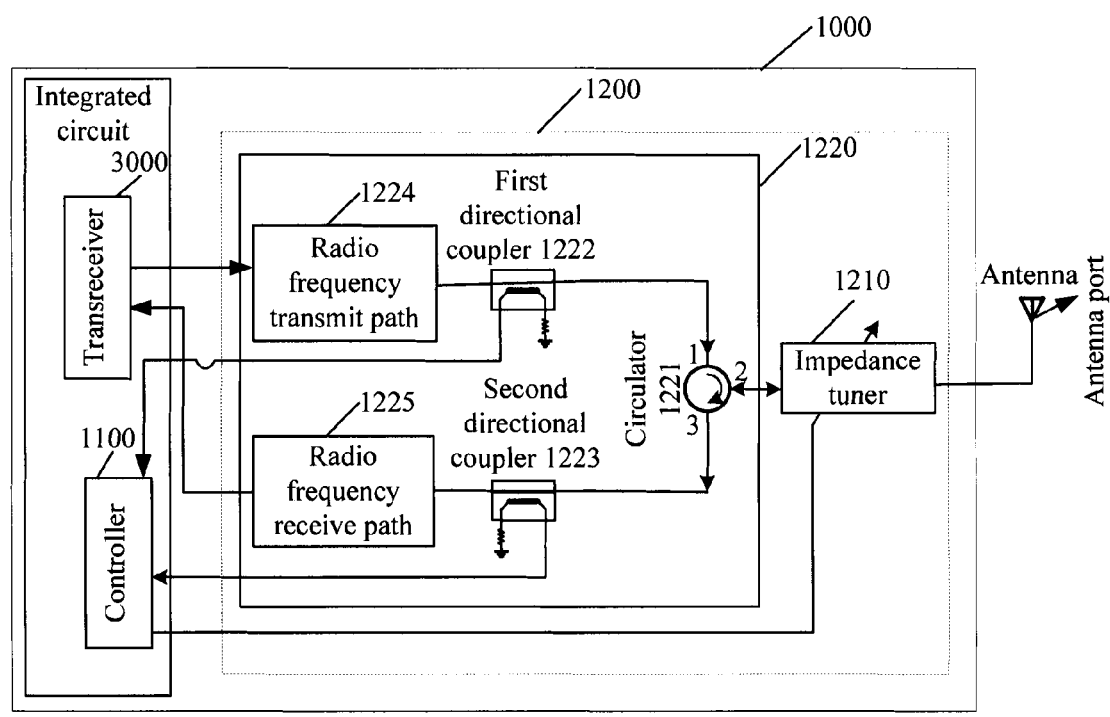

FIG. 1A and FIG. 1B are schematic block diagrams of a radio frequency circuit 1000 according to an embodiment of the present invention. As shown in FIG. 1A or 1B, the radio frequency circuit 1000 includes a controller 1100 and at least one duplexing module 1200.

The duplexing module 1200 includes an impedance tuner 1210 and at least one transmitter-receiver unit 1220, where the transmitter-receiver unit 1220 includes a circulator 1221, a first directional coupler 1222, a second directional coupler 1223, at least one radio frequency transmit path 1224, and at least one radio frequency receive path 1225.

The radio frequency transmit path 1224 is configured to receive a first transmit signal sent by a transceiver 3000 and perform filtering and amplifying processing on the first transmit signal to obtain a second transmit signal; the first directional coupler 1222 is configured to receive the second transmit signal, use a part of the second transmit signal as a third transmit signal, directly send the third transmit signal to the circulator 1221, and obtain, by means of coupling, a first coupling signal from the second transmit signal; the circulator 1221 includes a first port (a port 1 shown in FIG. 1A or FIG. 1B), a second port (a port 2 shown in FIG. 1A or FIG. 1B), and a third port (a port 3 shown in FIG. 1A or FIG. 1B) that are arranged in sequence in a circular direction of the circulator 1221, and the circulator 1221 is configured to receive the third transmit signal through the first port and output the third transmit signal through the second port; the impedance tuner 1210 is configured to transmit, to an antenna port, the third transmit signal output from the second port of the circulator 1221 and transmit, to the second port of the circulator 1221, a first input signal from the antenna port; the circulator 1221 is further configured to receive the first input signal through the second port and input the first input signal to the second directional coupler 1223 through the third port; the second directional coupler 1223 is configured to use a part of the first input signal as a second input signal, directly send the second input signal to the radio frequency receive path 1225, and obtain, by means of coupling, a second coupling signal from the first input signal; and the radio frequency receive path 1225 is configured to perform filtering processing on the second input signal to obtain a third input signal, and transmit the third input signal to the transceiver 3000 or perform other processing (for example, amplifying processing) on the third input signal and transmit an obtained signal to the transceiver 3000.

The controller 1100 is configured to adjust impedance of the impedance tuner 1210 according to the first coupling signal and the second coupling signal, so that impedance is matched on the second port of the circulator.

In the embodiment of the present invention, in any transmitter-receiver unit 1220 of any duplexing module 1200 included in the radio frequency circuit 1000, the radio frequency transmit path 1224 may acquire the first transmit signal from the transceiver 3000, perform the filtering and amplifying processing on the first transmit signal to obtain the second transmit signal, and transmit the second transmit signal to the first directional coupler 1222; after receiving the second transmit signal from the radio frequency transmit path 1224, the first directional coupler 1222 may use the part of the second transmit signal as the third transmit signal, directly send the third transmit signal to the circulator 1221, and obtain, by means of coupling, the first coupling signal from the second transmit signal; and after receiving, through the first port, the third transmit signal output by the first directional coupler 1222, the circulator 1221 transmits, through the second port, the third transmit signal to the impedance tuner 1210 included in the any duplexing module 1200. The impedance tuner 1210 transmits, to the antenna port, the third transmit signal output from the second port of the circulator 1221 of the any transmitter-receiver unit 1220, and because impedance mismatching may exist on the antenna port, a part of the third transmit signal may be reflected from the antenna port; the impedance tuner 1210 transmits, to the second port of the circulator 1221 of the any transmitter-receiver unit 1220, the first input signal from the antenna port, where the first input signal includes the reflected signal due to the impedance mismatching on the antenna port; after receiving the first input signal from the impedance tuner 1210 through the second port, the circulator 1221 of the any transmitter-receiver unit 1220 inputs the first input signal to the second directional coupler 1223 of the any transmitter-receiver unit 1220 through the third port; after receiving the first input signal output from the third port of the circulator 1221, the second directional coupler 1223 uses the part of the first input signal as the second input signal, directly sends the second input signal to the radio frequency receive path 1225 of the any transmitter-receiver unit 1220, and obtains, by means of coupling, the second coupling signal from the first input signal; and after receiving the second input signal directly sent by the second directional coupler 1223, the radio frequency receive path 1225 may perform the filtering processing on the second input signal to obtain the third input signal, and transmit the third input signal to the transceiver 3000 or perform other processing (for example, amplifying processing) on the third input signal and transmit the obtained signal to the transceiver 3000. The controller 1100 of the any duplexing module 1200 may adjust impedance of the impedance tuner 1210 according to the first coupling signal and the second coupling signal, so that impedance is matched on the second port of the circulator 1221 of the any transmitter-receiver unit 1220 of the any duplexing module 1200.

Because the circulator 1221 in the transmitter-receiver unit 1220 of the radio frequency circuit 1000 according to the embodiment of the present invention has a duplex function, and the radio frequency transmit path 1224 and the radio frequency receive path 1225 may have a filtering function, two functions, namely duplexing and filtering, are decoupled; in addition, because a working band of the circulator 1221 is a tunable or broadband band, a multimode and multi-frequency duplex function may be achieved, thereby reducing complexity, cost, and an area of the radio frequency circuit. A signal receive path and a signal transmit path according to the embodiment of the present invention may independently work at the same time, so that they may be compatible with both TDD and FDD modes, and complexity, cost, and an area of a radio frequency circuit may be further reduced.

In addition, the first directional coupler 1222 and the second directional coupler 1223 according to the embodiment of the present invention may respectively couple a transmit signal and an input signal to obtain the first coupling signal and the second coupling signal, and the controller 1100 may acquire impedance information of the antenna port according to the first coupling signal and the second coupling signal and perform impedance adjustment on the impedance tuner 1210 according to the impedance information of the antenna port, so that impedance matching may be achieved on a port that is of the circulator 1221 and connected to the antenna port, thereby ensuring an isolation of the circulator 122, so that the isolation of the circulator 1221 keeps unchanged when impedance of an antenna changes along with external environment. Therefore, an isolation between a receive path and a transmit path may be ensured. Further, in the any transmitter-receiver unit 1220, the first directional coupler 1222 and the second directional coupler 1223 may be respectively connected to different ports of the circulator 1221, so that the two directional couplers 1222 and 1223 are respectively located on the transmit path and the receive path, and in this way, directivity of the directional couplers 1222 and 1223 may be ensured, precision of impedance detection is improved, and insertion loss on the transmit path or the receive path may not be increased.

It should be understood that, FIG. 1A and FIG. 1B show a specific implementation manner of the present invention only for ease of understanding, and should not be construed as limitation on a scope of the present invention. The present invention further has another implementation manner, which is described in the following.

Optionally, in the embodiment of the present invention, when the radio frequency circuit 1000 includes a plurality of duplexing modules 1200, the controller 1100 may include a plurality of control units, where the plurality of control units may be in one-to-one correspondence with the plurality of duplexing modules 1200, that is, each control unit is configured to perform impedance adjustment on an impedance tuner 1210 included in a duplexing module 1200 corresponding to each control unit.

The controller 1100 according to the embodiment of the present invention may exist independently from the transceiver 3000, for example, as shown in FIG. 1A; or the controller 1100 according to the embodiment of the present invention and the transceiver 3000 may be integrated into one integrated circuit using an integrated circuit process, for example, as shown in FIG. 1B; or a part of functions of the controller 1100 according to the embodiment of the present invention and functions of the transceiver are integrated into one integrated circuit using an integrated circuit process; or in the embodiment of the present invention, all or a part of functions of the controller may be integrated into the transceiver.

It should be understood that, in FIG. 1A or FIG. 1B, although the transceiver exists independently from the radio frequency receive path and the radio frequency transmit path, the radio frequency receive path and the radio frequency transmit path according to the embodiment of the present invention, and the transceiver 3000 may also be integrated into one integrated circuit using an integrated circuit process; or a part of functions of the radio frequency receive path and the radio frequency transmit path according to the embodiment of the present invention, and the transceiver are integrated into one integrated circuit using an integrated circuit process; or in the embodiment of the present invention, all or a part of functions of the radio frequency receive path or the radio frequency transmit path may be integrated into the transceiver.

Optionally, a radio frequency circuit 1000 according to the embodiment of the present invention may be a radio frequency front-end circuit.

Figure 2:
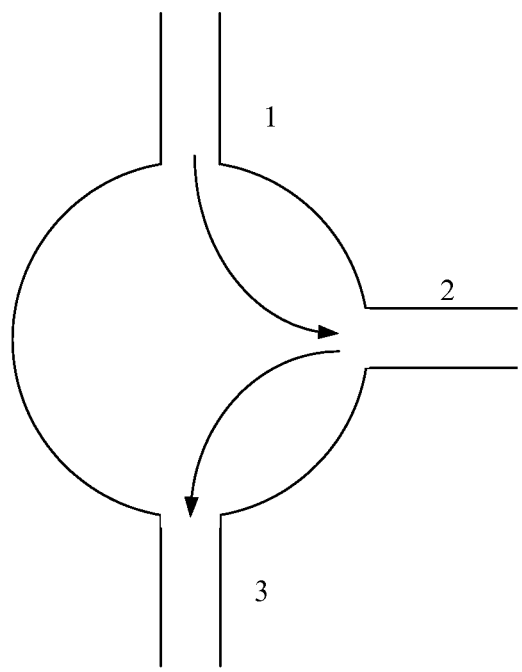
FIG. 2 is a diagram of a signal flow in a circulator according to another embodiment of the present invention.

In the embodiment of the present invention, a direction of a signal flow in the foregoing circulator 1221 is the first port→the second port→the third port, that is, a signal input from the first port needs to be output from the second port, and a signal input from the second port needs to be output from the third port. For example, as shown in FIG. 2, a signal input from the port 1 is output from the port 2, and a signal input from the port 2 is output from the port 3.

Figure 3:
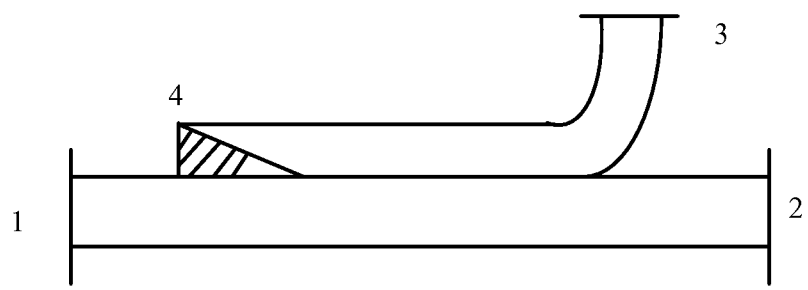
FIG. 3 is a schematic diagram of a directional coupler according to another embodiment of the present invention.

Optionally, in the embodiment of the present invention, the foregoing first directional coupler 1222 and second directional coupler 1223 may be waveguide directional couplers. In the embodiment of the present invention, a directional coupler may have four ports. For example, as shown in FIG. 3, a signal may be input from a port 1, a coupling signal obtained by coupling the signal may be output from a port 3, and a remaining signal, other than the coupling signal, may be output from a port 2; if the directional coupler needs to implement a unidirectional function, matched load may be connected to a port 4; in this case, there are only three ports that actually communicate with external entities, namely the port 1, the port 2, and the port 3, and the directional coupler in this state may also be referred to as a unidirectional coupler. The first directional coupler 1222 and the second directional coupler 1223 that are shown in FIG. 1A or FIG. 1B may be this type of unidirectional directional couplers; in this case, the foregoing second transmit signal may be input from the port 1 of the first directional coupler 1222, the first coupling signal may be output from the port 3, and the third transmit signal is output from the port 3; the foregoing first input signal may be input from the port 1 of the second directional coupler 1223, the second coupling signal may be output from the port 3, and the second input signal is output from the port 2; and the ports 4 of the first directional coupler 1222 and the second directional coupler 1223 may be connected to matched load. It should be understood that, port identifiers (IDs) 1, 2, 3, and 4 of a directional coupler are used only for ease of clearer description, and should not be construed as limitation on the embodiment of the present invention.

Optionally, in the embodiment of the present invention, when impedance matching is not achieved on the second port, the foregoing first input signal from the antenna port includes a signal received at an antenna and a signal that is obtained after the third transmit signal is reflected due to impedance mismatching on the antenna port, correspondingly, the second input signal received by the radio frequency receive path 1225 also includes a received signal and a reflected signal, and because frequency of the received signal and frequency of the reflected signal are different, the radio frequency receive path 1225 may perform filtering processing to remove the reflected signal. Optionally, the transceiver 3000 may also perform filtering processing to further remove the reflected signal.

Optionally, in the embodiment of the present invention, the filtering and amplifying processing of the radio frequency transmit path 1224 may be respectively implemented by a filter and a power amplifier (PA), where the power amplifier may be a multiple-band PA, and the filter may be a non-tunable filter, or may be a tunable filter. If the filter is a tunable filter, a band supported by the radio frequency transmit path 1224 may cover a relatively wide frequency range, and an area and cost of a radio frequency circuit may be further reduced.

Optionally, the filtering processing of the radio frequency receive path 1225 may be implemented using a filter, where the filter may be a non-tunable filter, or may be a tunable filter. If the filter is a tunable filter, a band supported by the radio frequency receive path 1225 may cover a relatively wide frequency range, and an area and cost of a radio frequency circuit may be further reduced. Optionally, the radio frequency receive path 1225 may further include an amplifier, where the amplifier is configured to perform amplifying processing on a signal that is filtered by the filter of the radio frequency receive path, so as to obtain the third input signal, and optionally, the amplifier may be an broadband low noise amplifier (LNA).

Optionally, in the embodiment of the present invention, the controller 1100 may acquire the impedance information of the antenna port according to the first coupling signal and the second coupling signal and perform the impedance adjustment on the impedance tuner 1210 according to the impedance information of the antenna port, so that impedance matching is achieved on the second port of the circulator 1221. The impedance information of the antenna port may include a standing wave ratio (which may also be referred to as a voltage standing wave ratio) that is of the antenna port and obtained according to a power of the first coupling signal and a power of the second coupling signal; or the impedance information of the antenna port may include a standing wave ratio that is of the antenna port and obtained according to a power of the first coupling signal and a power of the second coupling signal, and an impedance phase angle that is of the antenna port and obtained according to relative phases of the first coupling signal and the second coupling signal.

In the embodiment of the present invention, a state that impedance matching is achieved on the second port of the circulator 1221 refers to that, a ratio of a voltage of a transmit signal output from the second port of the circulator to a voltage of a reflected signal received on the second port is less than a preset value, that is, a TX-RX isolation of the circulator 1221 is greater than the pre-set value, for example, an isolation is greater than 20 decibels (dB). The impedance tuner may be adjusted according to the antenna standing wave ratio or according to the antenna standing wave ratio and the impedance phase angle of the antenna port, so that impedance matching is achieved on the second port of the circulator 1221, that is, the TX-RX isolation of the circulator 1221 is relatively high.

Optionally, when the impedance information of the antenna port includes the antenna standing wave ratio, a standing wave detection subunit of the controller 1100 may determine a power of a transmit signal according to a power of the first coupling signal and a corresponding coupling coefficient; in addition, because a power of a reflected signal of an input signal is far higher than a power of a signal received by an antenna, a signal received from the antenna port may be omitted (in a TDD working mode, standing wave detection needs be performed in a transmit timeslot), and the standing wave detection subunit may determine the power of the reflected signal according to a power of the second coupling signal and a corresponding coupling coefficient; therefore, the standing wave detection subunit may determine the antenna standing wave ratio according to the power of the transmit signal and the power of the reflected signal and perform impedance adjustment on the impedance tuner according to the antenna standing wave ratio, so that impedance matching is achieved on the second port of a corresponding circulator.

The standing wave ratio (which may also be referred to as a voltage standing wave ratio (VSWR)) of the antenna port is obtained according to the power of the transmit signal and the power of the reflected signal. When the VSWR is within a preset range, for example, when the VSWR ranges from 1 to 1.2, it may be considered that impedance matching is achieved on the second port of the circulator 1221, and if the VSWR is beyond the preset range, the impedance tuner may be adjusted to make the VSWR be within the preset range. A person skilled in the art should know that, in an actual application, a VSWR is generally used for describing an impedance matching degree, when a value of the VSWR is 1, an ideal impedance matching state is indicated, but in an engineering application, due to reasons, such as a process error, the ideal impedance matching state cannot be reached; therefore, according to different antenna tuning standards, when a value of the VSWR is within a preset range, it may be considered that impedance matching is achieved. Generally, the impedance tuner may be adjusted using an optimal algorithm, so that the VSWR is in the preset range. Adjustable capacitance in the impedance tuner may be gradually adjusted according to the antenna standing wave ratio. Each time after the adjustable capacitance is adjusted, a first coupling signal and a second coupling signal are reacquired and an antenna standing wave ratio is obtained according to the first coupling signal and the second coupling signal. If the antenna standing wave ratio is within the preset range, for example, 1 to 1.2, the adjustable capacitance is not adjusted any more, otherwise, the adjustable capacitance is further adjusted until the antenna standing wave ratio is within the preset range.

Optionally, when the impedance information of the antenna port includes the antenna standing wave ratio and an impedance phase angle of the antenna port, a standing wave detection subunit of the controller 1100 may determine a power of a transmit signal according to a power of the first coupling signal and a corresponding coupling coefficient; in addition, because a power of a reflected signal of an input signal is far higher than a power of a signal received by an antenna, a signal received from the antenna port may be omitted (in a TDD working mode, standing wave detection needs be performed in a transmit timeslot), and the standing wave detection subunit may determine the power of the reflected signal according to a power of the second coupling signal and a corresponding coupling coefficient; therefore, the standing wave detection subunit may determine the antenna standing wave ratio according to the power of the transmit signal and the power of the reflected signal. In addition, a phase angle detection subunit of the controller may determine an impedance phase angle of the antenna port according to relative phases of the first coupling signal and the second coupling signal, and because the power of the reflected signal of the input signal is far higher than the power of the signal received by the antenna, a relative phase may also be determined by omitting a signal that is in the transmit signal and received by the antenna, where in the TDD working mode, phase detection is performed only in a transmit timeslot.

An impedance value of the antenna port may be obtained according to the antenna standing wave ratio and the impedance phase angle of the antenna port. If the obtained impedance value of the antenna port is unequal to a set preferential impedance value, an impedance value of the impedance tuner may be adjusted to make the impedance value of the antenna port reach the preferential impedance value. For example, if a preferential impedance value of the antenna port is set to 50 ohms ($\Omega$), and a measured impedance value of the antenna port is 49 Ω, 1 Ω may be added to the impedance value of the impedance tuner. For example, if a set ideal impedance value of the antenna port is 50Ω, and a measured impedance value of the antenna port is 51 Ω, 1 Ω may be subtracted from the impedance value of the impedance tuner. It should be understood that, the foregoing preferential impedance value may be a specific value, or may be an impedance range. When an impedance value of an antenna port is equal to a set preferential impedance value, a TX-RX isolation of the circulator 1221 is relatively high.

Optionally, in the embodiment of the present invention, the controller 1100 may acquire the impedance information of the antenna port according to the first coupling signal and the second coupling signal periodically and perform dynamic adjustment on impedance of the impedance tuner according to the impedance information of the antenna port. When impedance mismatching on the antenna port is determined according to the impedance information of the antenna port, impedance of the impedance tuner 1210 may be adjusted.

Optionally, in the embodiment of the present invention, any duplexing module 1200 may include a plurality of transmitter-receiver units 1220 and a switch, where the switch may selectively transmit, to an impedance tuner, a transmit signal output from one of the plurality of transmitter-receiver units 1220 and selectively transmit, to one of the plurality of transmitter-receiver units 1220, an input signal output from the impedance tuner. Different transmitter-receiver units 1220 in the plurality of transmitter-receiver units 1220 may support different bands and/or communications standards.

Figure 4:
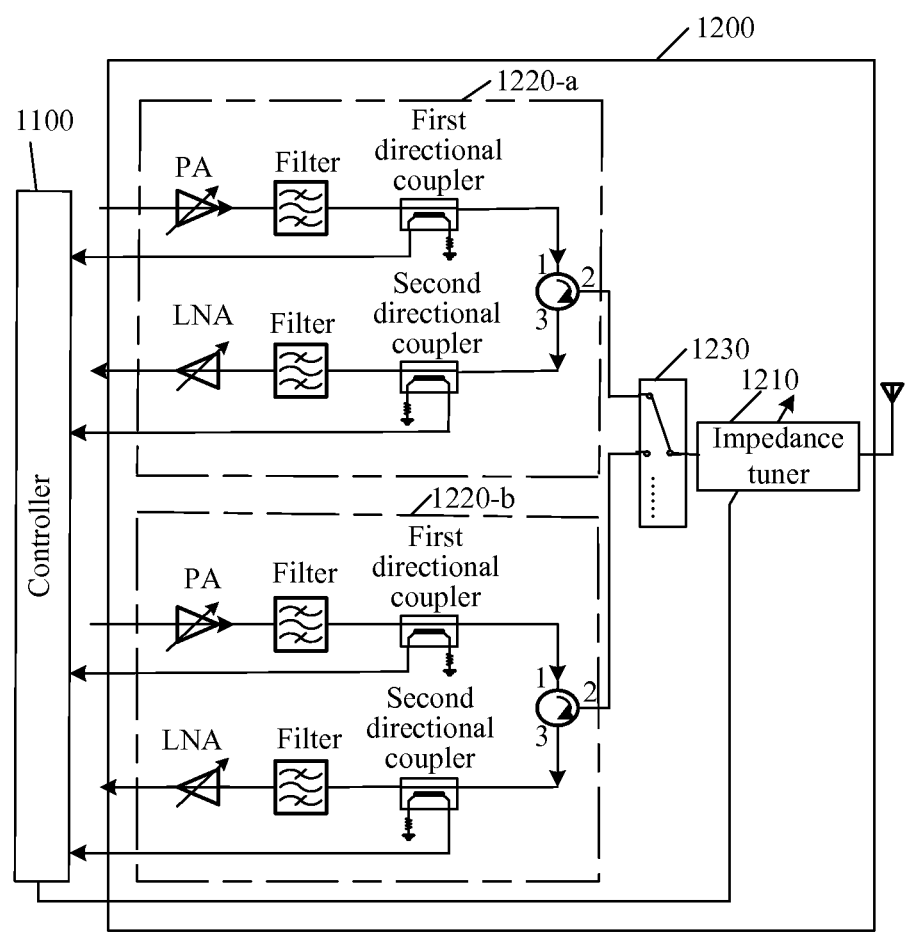
FIG. 4 is a schematic block diagram of a radio frequency circuit according to another embodiment of the present invention.

For example, as shown in FIG. 4, a duplexing module 1200 includes a transmitter-receiver unit 1220-*a*, a transmitter-receiver unit 1220-*b*, and a switch 1230, and the switch 1230 may selectively transmit, to an impedance tuner 1210, a transmit signal output from either of the transmitter-receiver unit 1220-*a* and the transmitter-receiver unit 1220-*b* and transmit, to the transmitter-receiver unit 1220-*a* or 1220-*b*, an input signal output from the impedance tuner 1210. The two transmitter-receiver units may support different bands. For example, the transmitter-receiver unit 1120-*a* may support a frequency range (for example, 3rd Generation Partnership Project (3GPP) lower band (LB) 700 Megahertz (M)-960 M), and the transmitter-receiver unit 1120-*b* may support another frequency range (for example, 3GPP high band (HB) 1700 M-2170 M, or ultra-high band (UHB) 2300 M-2700 M). If the duplexing module 1200 needs to work in a band, the transmitter-receiver unit supporting the band may be connected to the impedance tuner using the switch. The two transmitter-receiver units may also support different communications standards. For example, the transmitter-receiver unit 1220-*a* may support a third generation (3G) system, and the transmitter-receiver unit 1220-*b* may support a 4G system. If the duplexing module 1200 needs to work in a communications standard, the transmitter-receiver unit supporting the communications standard may be connected to the impedance tuner using the switch.

Optionally, in the embodiment of the present invention, any transmitter-receiver unit 1220 may include a plurality of radio frequency transmit paths 1224, a plurality of radio frequency receive paths 1225, a first switch, and a second switch, where the first switch is configured to selectively transmit, to a first directional coupler 1222, a second transmit signal output by one of the plurality of radio frequency transmit paths 1224; and the second switch is configured to selectively transmit, to one of the plurality of radio frequency receive paths 1225, a second input signal directly sent by the first directional coupler 1222. Different radio frequency transmit paths 1224 in the plurality of radio frequency transmit paths 1224 of the any transmitter-receiver unit 1220 may support different bands and/or communications standards; and different radio frequency receive paths 1225 in the plurality of radio frequency receive paths 1225 of the any transmitter-receiver unit 1220 may support different bands and/or communications standards.

Figure 5:
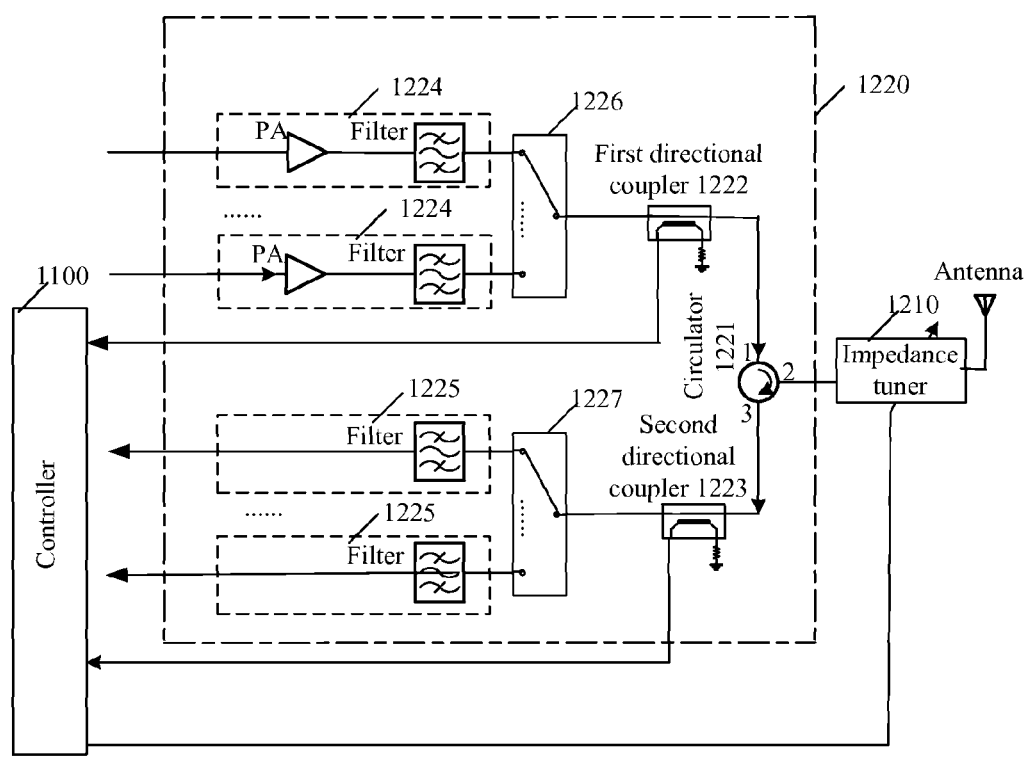
FIG. 5 is a schematic block diagram of a radio frequency circuit according to another embodiment of the present invention.

For example, as shown in FIG. 5, a transmitter-receiver unit 1220 may include a plurality of radio frequency transmit paths 1224 and a switch 1226, where the radio frequency transmit path 1224 may include a PA and a filter; and the switch 1226 may selectively transmit, to a first directional coupler 1222, a transmit signal output from one of the plurality of radio frequency transmit paths 1224. Different radio frequency transmit paths 1224 may support different bands, and if a duplexing module 1200 needs to work in a band, the radio frequency transmit path 1224 supporting the band may be connected to the first directional coupler 1222 using the switch 1226. Different radio frequency transmit paths 1224 may also support different communications standards, and if a duplexing module 1200 needs to work in a communications standard, the radio frequency transmit path 1224 supporting the communications standard may be connected to the first directional coupler 1222 using the switch 1226.

Similarly, as shown in FIG. 5, the transmitter-receiver unit 1220 may include a plurality of radio frequency receive paths 1225 and a switch 1227, where the radio frequency receive path 1225 may include a filter; and the switch 1227 may selectively transmit, to one of the plurality of radio frequency receive paths 1225, an input signal directly sent by a second directional coupler 1223. Different radio frequency receive paths 1225 may support different bands, and if a duplexing module 1200 needs to work in a band, the radio frequency receive path 1225 supporting the band may be connected to the second directional coupler 1223 using the switch 1227. Different radio frequency receive paths 1225 may also support different communications standards, and if the duplexing module 1200 needs to work in a communications standard, the radio frequency receive path supporting the communications standard may be connected to the second directional coupler 1223 using the switch 1227.

Optionally, in the embodiment of the present invention, the radio frequency circuit 1000 includes a plurality of duplexing modules 1200 and further includes a diplexer, where the plurality of duplexing modules 1200 is separately coupled to an antenna port using the diplexer, and the diplexer is configured to transmit, according to different bands, a first input signal to a duplexing module corresponding to a band of the first input signal. In this case, the embodiment of the present invention may be applied to a scenario in which receiving and transmitting are performed on a plurality of bands simultaneously, for example, a scenario of LTE interband carrier aggregation (CA).

Figure 6:
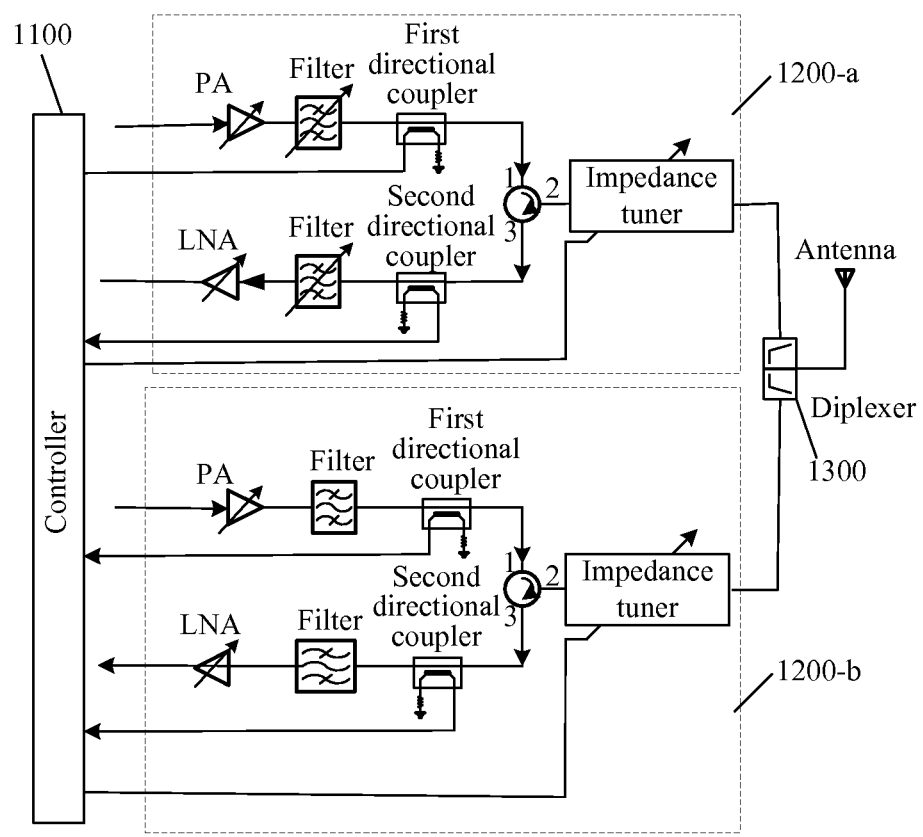
FIG. 6 is a schematic block diagram of a radio frequency circuit according to another embodiment of the present invention.

For example, as shown in FIG. 6, two duplexing modules are connected to an antenna using a diplexer 1300, where a duplexing module 1200-*a* shown on an upper part of FIG. 6 may support a HB, and a duplexing module 1200-*b* shown on a lower part of FIG. 6 may support a LB. During specific operation, a broadband antenna simultaneously receives or transmits LB/HB signals, and using the diplexer, transmits the LB signal to an LB channel (that is, the duplexing module shown on the lower part of FIG. 6), and transmits the HB signal to an HB channel (that is, the duplexing module shown on the upper part of FIG. 6), where the LB signal and the HB signal do not interfere with each other theoretically. Certainly, the radio frequency circuit shown in FIG. 6 may also be applied to a non-CA scenario.

It should be understood that, the radio frequency circuits shown in FIG. 1A and FIG. 1B to FIG. 6 are only specific implementation manners of the present invention, and should not be construed as limitation on a protection scope of the present invention.

It should be understood that, the radio frequency circuit shown in FIG. 4, FIG. 5, or FIG. 6 includes a PA and a filter and the radio frequency receive path includes an LNA (and a filter), but the radio frequency transmit path and the radio frequency receive path according to the embodiment of the present invention may include another component, and should not be construed as limitation on the embodiment of the present invention; and all or a part of functions of the radio frequency transmit path or the radio frequency receive path according to the embodiment of the present invention, and the transceiver may also be integrated into one integrated circuit using an integrated circuit process; or in the embodiment of the present invention, all or a part of functions of the radio frequency receive path or the radio frequency transmit path may be integrated into the transceiver 3000.

It should be understood that, the filter shown in FIG. 4, FIG. 5, or FIG. 6 may be a band-pass filter supporting a fixed band, and certainly, may be a tunable band-pass filter; in this case, a band supported by the radio frequency receive path 1225 may cover a relatively wide frequency range, or a band supported by the radio frequency transmit path 1224 may cover a relatively wide frequency range. Therefore, an area and cost of a radio frequency circuit may be further reduced.

Optionally, the radio frequency circuit 1000 according to the embodiment of the present invention may be applied to a mobile terminal. Certainly, the radio frequency circuit according to the embodiment of the present invention may also be applied to another device, which is not limited in the embodiment of the present invention.

Therefore, because the circulator 1221 in the transmitter-receiver unit 1220 of the radio frequency circuit 1000 according to the embodiment of the present invention has a duplex function, and the radio frequency transmit path 1224 and the radio frequency receive path 1225 may have a filtering function, two functions, namely duplexing and filtering, are decoupled; in addition, because a working band of the circulator 1221 is a tunable or broadband band, a multimode and multi-frequency duplex function may be achieved, thereby reducing complexity, cost, and an area of a radio frequency circuit. A signal receive path and a signal transmit path according to the embodiment of the present invention may independently work at the same time, so that they may be compatible with both TDD and FDD modes, and complexity, cost, and an area of a radio frequency circuit may be further reduced.

In addition, the first directional coupler 1222 and the second directional coupler 1223 according to the embodiment of the present invention may respectively couple a transmit signal and an input signal to obtain the first coupling signal and the second coupling signal, and the controller 1100 may acquire impedance information of the antenna port according to the first coupling signal and the second coupling signal and perform impedance adjustment on the impedance tuner 1210 according to the impedance information of the antenna port, so that impedance matching may be achieved on a port that is of the circulator 1221 and connected to the antenna port, thereby ensuring an isolation of the circulator 1221 and making the isolation of the circulator 1221 keep unchanged when impedance of an antenna changes along with changes of external environment. Therefore, an isolation between a receive path and a transmit path may be ensured. Further, in the any transmitter-receiver unit 1220, the first directional coupler 1222 and the second directional coupler 1223 are respectively connected to different ports of the circulator 1221, so that the two directional couplers 1222 and 1223 are respectively located on the transmit path and the receive path, and in this way, directivity of the directional couplers 1222 and 1223 may be ensured, precision of impedance detection is improved, and insertion loss on the transmit path or the receive path may not be increased.

The foregoing, with reference to FIG. 1A and FIG. 1B to FIG. 6, describes the radio frequency circuit 1000 according to the embodiment of the present invention. The following, with reference to FIG. 7A and FIG. 7B to FIG. 12, describes a radio frequency circuit 2000 according to an embodiment of the present invention.

Figure 7A:
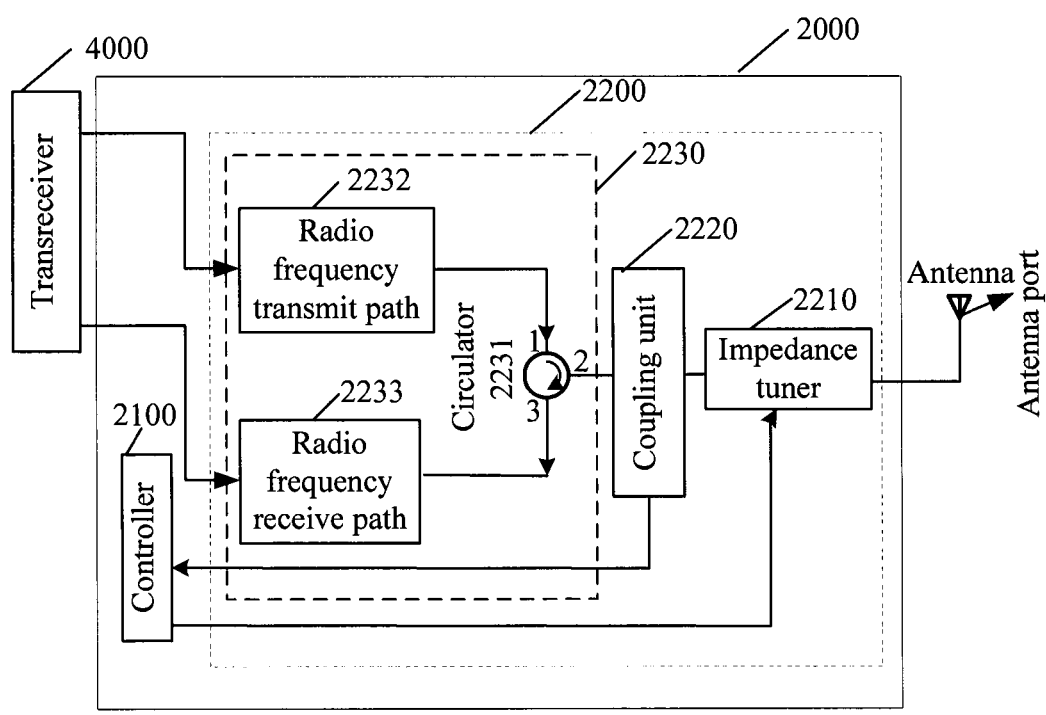
FIG. 7A and FIG. 7B are schematic block diagrams of a radio frequency circuit according to another embodiment of the present invention.
Figure 7B:
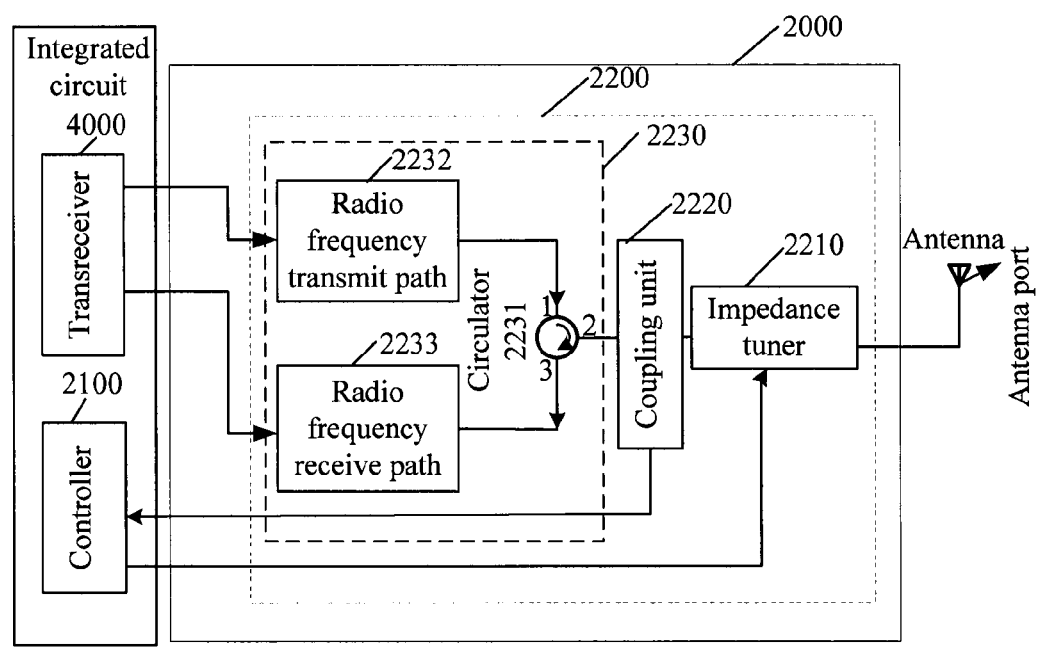

FIG. 7A and FIG. 7B are schematic block diagrams of the radio frequency circuit 2000 according to the embodiment of the present invention. As shown in FIG. 7A or 7B, the radio frequency circuit 2000 includes a controller 2100 and at least one duplexing module 2200.

The duplexing module 2200 includes an impedance tuner 2210, a coupling unit 2220, and at least one transmitter-receiver unit 2230, where the transmitter-receiver unit 2230 includes a circulator 2231, at least one radio frequency transmit path 2232, and at least one radio frequency receive path 2233.

The radio frequency transmit path 2222 is configured to receive a first transmit signal from a transceiver 4000 and perform filtering and amplifying processing on the first transmit signal to obtain a second transmit signal; the circulator 2231 includes a first port (a port 1 shown in FIG. 7A or FIG. 7B), a second port (a port 2 shown in FIG. 7A or FIG. 7B), and a third port (a port 3 shown in FIG. 7A or FIG. 7B) that are arranged in sequence in a circular direction of the circulator 2231, and the circulator 2231 is configured to receive the second transmit signal through the first port and output the second transmit signal through the second port; the coupling unit 2220 is configured to receive the second transmit signal, use a part of the second transmit signal as a third transmit signal, directly send the third transmit signal to the impedance tuner 2210, and obtain, by means of coupling, a first coupling signal from the second transmit signal; the impedance tuner 2210 is configured to transmit, to an antenna port, the third transmit signal and transmit, to the coupling unit 2220, a first input signal from the antenna port; the coupling unit 2220 is further configured to use a part of the first input signal as a second input signal, directly send the second input signal to the circulator 2231, and obtain, by means of coupling, a second coupling signal from the first input signal; the circulator 2231 is further configured to receive the second input signal through the second port and input the second input signal to the radio frequency receive path 2233 through the third port; and the radio frequency receive path 2233 is configured to perform filtering processing on the second input signal to obtain a third input signal, and input the third input signal to the transceiver 4000 or perform other processing on the third input signal and input an obtained signal to the transceiver 4000.

The controller 2100 is configured to adjust impedance of the impedance tuner 2210 according to the first coupling signal and the second coupling signal, so that impedance matching is achieved on the second port of the circulator 2231.

In the embodiment of the present invention, in the any transmitter-receiver unit 2230 of any duplexing module 2200 included in the radio frequency circuit 2000, the radio frequency transmit path 2232 may acquire the first transmit signal from the transceiver 4000, perform the filtering and amplifying processing on the first transmit signal to obtain the second transmit signal, and transmit the second transmit signal to the circulator 2231; after receiving, through the first port, the second transmit signal output from the radio frequency transmit path 2232, the circulator 2231 transmits, through the second port, the second transmit signal to the coupling unit 2220 included in the any duplexing module 2200; after receiving the second transmit signal input by the circulator, the coupling unit 2220 may use the part of the second transmit signal as the third transmit signal, directly send the third transmit signal to the impedance tuner 2210 of the any duplexing module 2200, and obtain, by means of coupling, the first coupling signal from the second transmit signal; after receiving the third transmit signal directly sent by the coupling unit 2220, the impedance tuner 2210 transmits the third transmit signal to the antenna port, and because impedance mismatching may exist on the antenna port, a part of the third transmit signal may be reflected from the antenna port; the impedance tuner 2210 transmits the first input signal from the antenna port to the coupling unit 2220 of the any duplexing module; after receiving the first input signal output from the impedance tuner 2210, the coupling unit 2220 uses the part of the first input signal as the second input signal, directly sends the second input signal to the circulator 2231 of the any transmitter-receiver unit 2230, and obtains, by means of coupling, a second coupling signal from the first input signal; after receiving the second input signal from the coupling unit 2220 through the second port, the circulator 2231 of the any transmitter-receiver unit 2230 inputs the second input signal to the radio frequency receive path 2233 of the any transmitter-receiver unit 2230 through the third port; and after receiving the second input signal output by the circulator 2231, the radio frequency receive path 2233 may perform filtering processing on the second input signal to obtain a third input signal, and transmit the third input signal to the transceiver 4000 or perform other processing (for example, amplifying processing) on the third input signal and transmit an obtained signal to the transceiver 4000. The controller 2100 may adjust impedance of the impedance tuner 2210 of the any duplexing module 2200 according to the first coupling signal and the second coupling signal, so that impedance matching is achieved on the second port of the circulator 2231 of the any one transmitter-receiver unit 2230 of the any duplexing module 2200.

Therefore, because the circulator 2231 of the transmitter-receiver unit 2230 of the radio frequency circuit 2000 according to the embodiment of the present invention has a duplex function, and the radio frequency receive path 2233 and the radio frequency transmit path 2232 may have a filtering function, two functions, namely duplexing and filtering, are decoupled; in addition, because a working band of the circulator is a tunable or broadband band, a multimode and multi-frequency duplex function may be achieved, thereby reducing complexity, cost, and an area of a radio frequency circuit. A signal receive path and a signal transmit path according to the embodiment of the present invention may independently work at the same time, so that they may be compatible with both TDD and FDD modes, and complexity, cost, and an area of a radio frequency circuit may be further reduced.

In addition, the coupling unit 2220 according to the embodiment of the present invention may couple a transmit signal and an input signal to obtain the first coupling signal and the second coupling signal, and the controller 2100 may acquire impedance information of the antenna port according to the first coupling signal and the second coupling signal and perform impedance adjustment on the impedance tuner 2210 according to the impedance information of the antenna port, so that impedance matching may be achieved on a port that is of the circulator 2231 and connected to the antenna port, thereby ensuring an isolation of the circulator 2231 and making the isolation of the circulator 2231 keep unchanged when impedance of an antenna changes along with changes of external environment. Therefore, an isolation between a receive path and a transmit path may be ensured.

It should be understood that, FIG. 7A and FIG. 7B show a specific implementation manner in the present invention only for ease of understanding, and should not be construed as limitation on a scope of the present invention. The present invention further has another implementation manner, which is described in the following.

Optionally, in the embodiment of the present invention, when the radio frequency circuit 2000 includes a plurality of duplexing modules 2200, the controller 2100 may include a plurality of control units, where the plurality of control units may be in one-to-one correspondence with the plurality of duplexing modules 2200, that is, each control unit is configured to perform impedance adjustment on an impedance tuner 2210 included in a duplexing module 2200 corresponding to each control unit.

The controller 2100 according to the embodiment of the present invention may exist independently from the transceiver 4000, for example, as shown in FIG. 7A; or the controller 2100 according to the embodiment of the present invention and the transceiver 4000 may be integrated into one integrated circuit using an integrated circuit process, for example, as shown in FIG. 7B; or a part of functions of the controller 2100 according to the embodiment of the present invention and the transceiver 4000 are integrated into one integrated circuit using an integrated circuit process; or in the embodiment of the present invention, all or a part of functions of the controller may be integrated into the transceiver.

It should be understood that, in FIG. 7A and FIG. 7B, although the transceiver exists independently from the radio frequency receive path and the radio frequency transmit path, the radio frequency receive path and the radio frequency transmit path according to the embodiment of the present invention, and the transceiver 4000 may also be integrated into one integrated circuit using an integrated circuit process; or a part of functions of the radio frequency receive path and the radio frequency transmit path according to the embodiment of the present invention, and the transceiver 4000 are integrated into one integrated circuit using an integrated circuit process; or in the embodiment of the present invention, all or a part of functions of the radio frequency receive path or the radio frequency transmit path may be integrated into the transceiver.

Optionally, a radio frequency circuit 2000 according to the embodiment of the present invention may be a radio frequency front-end circuit.

In the embodiment of the present invention, a direction of a signal flow in the foregoing circulator 2231 is the first port→the second port→the third port, that is, a signal input from the first port needs to be output from the second port, and a signal input from the second port needs to be output from the third port. For example, as shown in FIG. 2, a signal input from the port 1 is output from the port 2, and a signal input from the port 2 is output from the port 3.

Optionally, in the embodiment of the present invention, when impedance matching is not achieved on the second port, the foregoing first input signal from the antenna port includes a signal received at an antenna and a signal that is obtained after the third transmit signal is reflected due to impedance mismatching on the antenna port, correspondingly, the second input signal received by the radio frequency receive path 2233 also includes a received signal and a reflected signal, and because frequency of the received signal and frequency of the reflected signal are different, the radio frequency receive path 2233 may perform filtering processing to remove the reflected signal. Optionally, the transceiver performs filtering processing to further remove the reflected signal.

Optionally, in the embodiment of the present invention, the filtering and amplifying processing of the radio frequency transmit path 2232 may be respectively implemented by a filter and a PA, where the power amplifier may be a multiple-band PA, and the filter may be a non-tunable filter, or may be a tunable filter. If the filter is a tunable filter, a band supported by the radio frequency transmit path 2232 may cover a relatively wide frequency range, and an area and cost of a radio frequency circuit may be further reduced.

Optionally, the filtering processing of the radio frequency receive path 2233 may be implemented using a filter, where the filter may be a non-tunable filter, or may be a tunable filter. If the filter is a tunable filter, a band supported by the radio frequency receive path 2233 may cover a relatively wide frequency range, and an area and cost of a radio frequency circuit may be further reduced. Optionally, the radio frequency receive path 2233 may further include an amplifier, where the amplifier is configured to perform amplifying processing on a signal that is filtered by the filter of the radio frequency receive path, so as to obtain the third input signal, and optionally, the amplifier may be an broadband LNA.

Optionally, the radio frequency receive path 2233 and the radio frequency transmit path 2232 according to the embodiment of the present invention may exist independently from the transceiver; or all or a part of functions of the radio frequency receive path 2233 or the radio frequency transmit path 2232, and the transceiver 4000 are integrated into an integrated circuit using an integrated circuit process; or in the embodiment of the present invention, all or a part of functions of the radio frequency receive path or the radio frequency transmit path may be integrated into the transceiver 4000.

Optionally, in the embodiment of the present invention, the controller 2100 may acquire the impedance information of the antenna port according to the first coupling signal and the second coupling signal and perform the impedance adjustment on the impedance tuner 2210 according to the impedance information of the antenna port, so that impedance matching is achieved on the second port of the circulator 2231. The impedance information of the antenna port may include a standing wave ratio (which may also be referred to as a voltage standing wave ratio) that is of the antenna port and obtained according to a power of the first coupling signal and a power of the second coupling signal; or the impedance information of the antenna port may include a standing wave ratio that is of the antenna port and obtained according to a power of the first coupling signal and a power of the second coupling signal, and an impedance phase angle that is of the antenna port and obtained according to relative phases of the first coupling signal and the second coupling signal.

In the embodiment of the present invention, that impedance matching is achieved on the second port of the circulator 2231 refers to that, a ratio of a voltage of a transmit signal output from the second port of the circulator 2231 to a voltage of a reflected signal received on the second port is less than a preset value, that is, a TX-RX isolation of the circulator is greater than the pre-set value, for example, an isolation is greater than 20 dB. The impedance tuner 2210 may be adjusted according to the antenna standing wave ratio or according to the antenna standing wave ratio and the impedance phase angle of the antenna port, so that impedance matching is achieved on the second port of the circulator 2231, that is, the TX-RX isolation of the circulator 2231 is relatively high.

Optionally, when the impedance information of the antenna port includes the antenna standing wave ratio, a standing wave detection subunit of the controller 2100 may determine a power of a transmit signal according to a power of the first coupling signal and a corresponding coupling coefficient; in addition, because a power of a reflected signal of an input signal is far higher than a power of a signal received by an antenna, a signal received from the antenna port may be omitted (in a TDD working mode, standing wave detection needs be performed in a transmit timeslot), and the standing wave detection subunit may determine the power of the reflected signal according to a power of the second coupling signal and a corresponding coupling coefficient; therefore, the standing wave detection subunit may determine the antenna standing wave ratio according to the power of the transmit signal and the power of the reflected signal and perform impedance adjustment on the impedance tuner 2210 according to the antenna standing wave ratio, so that impedance matching is achieved on the second port of a corresponding circulator 2231.

The VSWR of the antenna port is obtained according to the power of the transmit signal and the power of the reflected signal. When the VSWR is within a preset range, for example, when the VSWR ranges from 1 to 1.2, it may be considered that impedance matching is achieved on the second port of the circulator 2231, and if the VSWR is beyond the preset range, the impedance tuner 2210 may be adjusted to make the VSWR be within the preset range. A person skilled in the art should know that, in an actual application, a VSWR is generally used for describing an impedance matching degree, when a value of the VSWR is 1, an ideal impedance matching state is indicated, but in an engineering application, due to reasons, such as a process error, the ideal impedance matching state cannot be reached; therefore, according to different antenna tuning standards, when a value of the VSWR is within a preset range, it may be considered that impedance matching is achieved. Generally, the impedance tuner may be adjusted using an optimal algorithm, so that the VSWR is in the preset range. Adjustable capacitance in the impedance tuner may be gradually adjusted according to the antenna standing wave ratio. Each time after the adjustable capacitance is adjusted, a first coupling signal and a second coupling signal are reacquired and an antenna standing wave ratio is obtained according to the first coupling signal and the second coupling signal. If the antenna standing wave ratio is within the preset range, for example, 1 to 1.2, the adjustable capacitance is not adjusted any more, otherwise, the adjustable capacitance is further adjusted until the antenna standing wave ratio is within the preset range.

Optionally, when the impedance information of the antenna port includes the antenna standing wave ratio and an impedance phase angle of the antenna port, a standing wave detection subunit of the controller 2100 may determine a power of a transmit signal according to a power of the first coupling signal and a corresponding coupling coefficient; in addition, because a power of a reflected signal of an input signal is far higher than a power of a signal received by an antenna, a signal received from the antenna port may be omitted (in a TDD working mode, standing wave detection needs be performed in a transmit timeslot), and the standing wave detection subunit may determine the power of the reflected signal according to a power of the second coupling signal and a corresponding coupling coefficient; therefore, the standing wave detection subunit may determine the antenna standing wave ratio according to the power of the transmit signal and the power of the reflected signal. In addition, a phase angle detection subunit of the controller 2100 may determine an impedance phase angle of the antenna port according to relative phases of the first coupling signal and the second coupling signal, and because the power of the reflected signal of the input signal is far higher than the power of the signal received by the antenna, a relative phase may also be determined by omitting a signal that is in the transmit signal and received by the antenna, where in the TDD working mode, phase detection is performed only in a transmit timeslot.

An impedance value of the antenna port may be obtained according to the antenna standing wave ratio and the impedance phase angle of the antenna port. If the obtained impedance value of the antenna port is unequal to a set preferential impedance value, an impedance value of the impedance tuner 2210 may be adjusted to make the impedance value of the antenna port reach the preferential impedance value. For example, if a preferential impedance value of the antenna port is set to 50Ω, and a measured impedance value of the antenna port is 49Ω, 1Ω may be added to the impedance value of the impedance tuner. For example, if a set ideal impedance value of the antenna port is 50Ω, and a measured impedance value of the antenna port is 51Ω, 1Ω may be subtracted from the impedance value of the impedance tuner 2210. It should be understood that, the foregoing preferential impedance value may be a specific value, or may be an impedance range. When an impedance value of an antenna port is equal to a set preferential impedance value, a TX-RX isolation of the circulator 2231 is relatively high.

Optionally, in the embodiment of the present invention, the controller 2100 may acquire the impedance information of the antenna port according to the first coupling signal and the second coupling signal periodically and perform dynamic adjustment on impedance of the impedance tuner according to the impedance information of the antenna port. When impedance mismatching on the antenna port is determined according to the impedance information of the antenna port, impedance of the impedance tuner 2210 may be adjusted.

Optionally, in the embodiment of the present invention, when the transmitter-receiver unit 2230 includes a plurality of radio frequency transmit paths 2232 and a plurality of radio frequency receive paths 2233, the transmitter-receiver unit 2230 further includes a first switch and a second switch, where the first switch is configured to selectively transmit, to the circulator 2231, the second transmit signal output by one of the plurality of radio frequency transmit paths 2232; and the second switch is configured to selectively transmit, to one of the plurality of radio frequency receive paths 2233, the second input signal output from the third port of the circulator 2231. Different radio frequency transmit paths 2232 of the plurality of radio frequency transmit paths 2232 of the any transmitter-receiver unit 2230 may support different bands and/or communications standards; and different radio frequency receive paths 2233 of the plurality of radio frequency receive paths 2233 in the any transmitter-receiver unit 2230 may support different bands and/or communications standards.

Figure 8:
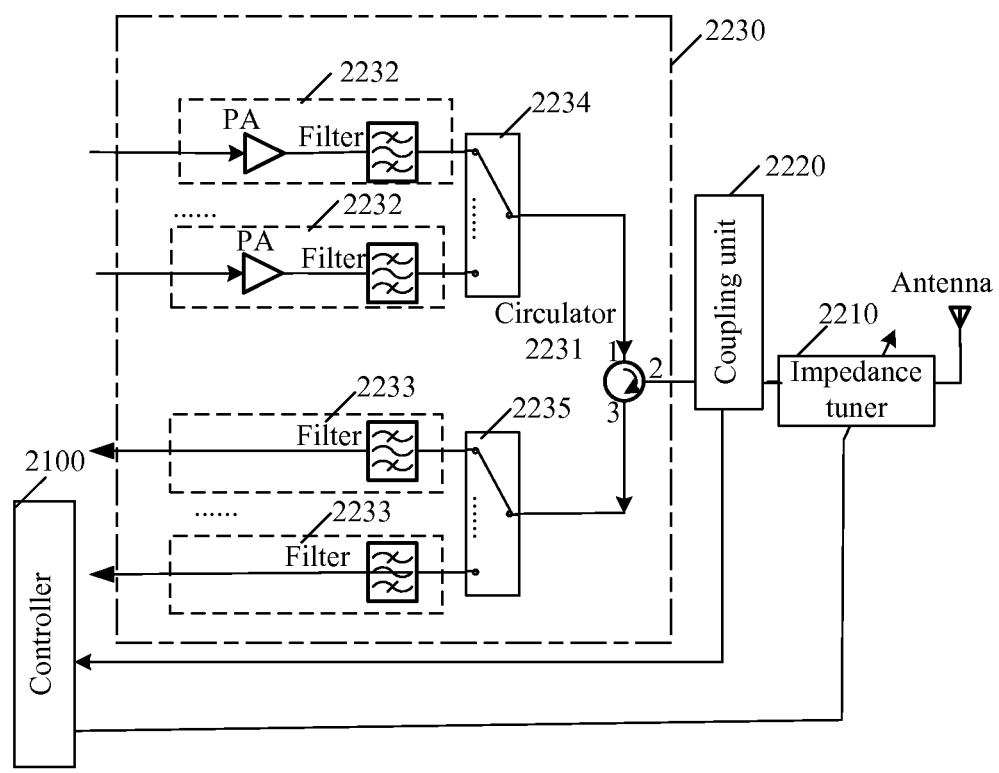
FIG. 8 is a schematic block diagram of a radio frequency circuit according to another embodiment of the present invention.

For example, as shown in FIG. 8, a transmitter-receiver unit 2230 may include a plurality of radio frequency transmit paths 2232 and a switch 2234, where the radio frequency transmit path 2232 may include a PA and a filter; and the switch 2234 may selectively transmit, to a circulator 2231, a transmit signal output from one of the plurality of radio frequency transmit paths 2232. Different radio frequency transmit paths 2232 may support different bands, and if a duplexing module 2200 needs to work in a band, the radio frequency transmit path 2232 supporting the band may be connected to the circulator 2231 using the switch 2234. Different radio frequency transmit paths 2232 may also support different communications standards, and if a duplexing module 2200 needs to work in a communications standard, the radio frequency transmit path supporting the communications standard may be connected to the circulator 2231 using the switch 2234.

Similarly, as shown in FIG. 8, the transmitter-receiver unit 2230 may include a plurality of radio frequency receive paths 2233 and include a switch 2235, where the radio frequency receive path 2233 may include a filter; and the switch 2235 may selectively transmit, to one of the plurality of radio frequency receive paths 2233, an input signal output from the circulator 2231. Different radio frequency receive paths 2233 may support different bands, and if a duplexing module 2200 needs to work in a band, the radio frequency receive path 2233 supporting the band may be connected to the circulator 2231 using the switch 2235; and different radio frequency receive paths 2233 may also support different communications standards, and if a duplexing module 2200 needs to work in a communications standard, the radio frequency receive path 2233 supporting the communications standard may be connected to the circulator 2231 using the switch 2235.

Optionally, in the embodiment of the present invention, when the duplexing module 2200 includes a plurality of transmitter-receiver units 2230, the duplexing module 2200 further includes a third switch, and the coupling unit 2220 includes a plurality of directional couplers, where each directional coupler is corresponding to one transmitter-receiver unit, the directional coupler is configured to obtain, by means of coupling, a first coupling signal from a second transmit signal output from the second port of the circulator 2231 of the transmitter-receiver unit 2230 corresponding to the directional coupler, use a part of the second transmit signal, which is output by the transmitter-receiver unit 2230 corresponding to the directional coupler, as a third transmit signal and directly send the third transmit signal to the third switch, and the third switch is configured to selectively transmit, to the impedance tuner 2210, the third transmit signal output by one of the plurality of directional couplers; and the third switch is further configured to selectively transmit, to one of the plurality of directional couplers, the first input signal output by the impedance tuner 2210, and the directional coupler is further configured to use a part of the first input signal as a second input signal, directly send the second input signal to the circulator of the transmitter-receiver unit 2230 corresponding to the directional coupler, and obtain, through coupling, a second coupling signal from the first input signal.

Figure 9:
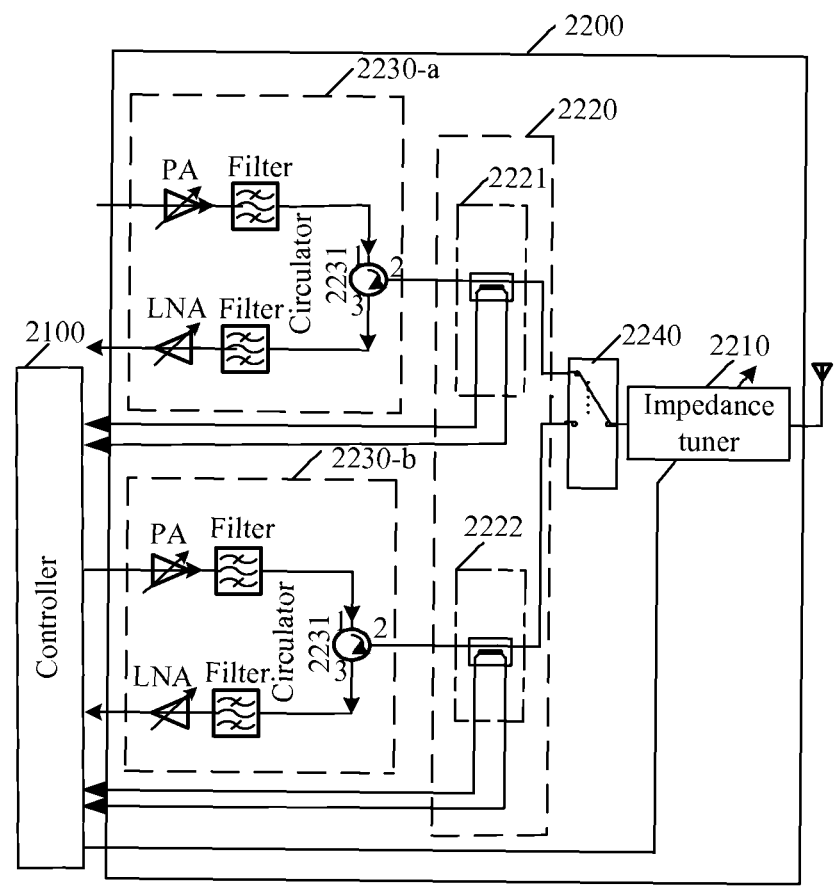
FIG. 9 is a schematic block diagram of a radio frequency circuit according to another embodiment of the present invention.

For example, as shown in FIG. 9, a duplexing module 2200 includes two transmitter-receiver units 2230-*a* and 2230-*b* and includes a switch 2240. A coupling unit includes a directional coupler 2221 and a directional coupler 2222, where the directional coupler 2221 is corresponding to the transmitter-receiver unit 2230-*a* and is configured to obtain, by means of coupling, a first coupling signal from a second transmit signal output from a second port of a circulator of the transmitter-receiver unit 2230-*a*, use a part of the second transmit signal, which is output by the transmitter-receiver unit 2230-*a*, as a third transmit signal, and directly send the third transmit signal to the switch 2240; the directional coupler 2222 is corresponding to the transmitter-receiver unit 2230-*b* and is configured to obtain, by means of coupling, a first coupling signal from a second transmit signal output from a second port of a circulator of the transmitter-receiver unit 2230-*b*, use a part of the second transmit signal, which is output by the transmitter-receiver unit 2230-*b*, as a third transmit signal, and directly send the third transmit signal to the switch 2240; the switch 2240 is configured to transmit, to an impedance tuner 2210, the third transmit signal output by either of the directional coupler 2221 and the directional coupler 2222, and is further configured to selectively transmit, to either of the directional coupler 2221 and the directional coupler 2222, a first input signal output by the impedance tuner 2210; and after receiving the first input signal, the directional coupler 2221 or the directional coupler 2222 uses a part of the first input signal as a second input signal, directly sends the second input signal to a circulator 2231 of the corresponding transmitter-receiver unit 2230-*a* or 2230-*b*, and obtain, by means of coupling, a second coupling signal from the first input signal.

The two transmitter-receiver units shown in FIG. 9 may support different bands. For example, the transmitter-receiver unit 2230-*a* may support a frequency range (for example, 3GPP LB 700 M-960 M), and the transmitter-receiver unit 2230-*b* may support another frequency range (for example, 3GPP HB 1700 M-2170 M, or UHB 2300 M-2700 M). If the duplexing module 2200 needs to work in a band, the directional coupler corresponding to the transmitter-receiver unit supporting the band may be connected to the impedance tuner using the switch 2240. The two transmitter-receiver units may also support different communications standards. For example, the transmitter-receiver unit 2230-*a* may support a 3G system, and the transmitter-receiver unit 2230-*b* may support a 4G system. If the duplexing module 2200 needs to work in a band, the directional coupler corresponding to the transmitter-receiver unit supporting the communications standard may be connected to the impedance tuner using the switch.

Optionally, in the embodiment of the present invention, when the duplexing module 2200 includes a plurality of transmitter-receiver units 2230, the duplexing module 2200 further includes a fourth switch; the fourth switch is configured to selectively transmit, to a coupling unit, a second transmit signal output by one of the plurality of transmitter-receiver units 2230, and the coupling unit is configured to use a part of the second transmit signal, which is output by the fourth switch, as a third transmit signal, directly send the third transmit signal to an impedance tuner 2210, and obtain, by means of coupling, a first coupling signal from the second transmit signal; the coupling unit is further configured to use a part of a first input signal as a second input signal, directly send the second input signal to the fourth switch, and obtain, by means of coupling, a second coupling signal from the first input signal; and the fourth switch is further configured to selectively transmit the second input signal to one of the plurality of transmitter-receiver units, where the coupling unit 2220 is a directional coupler.

Figure 10:
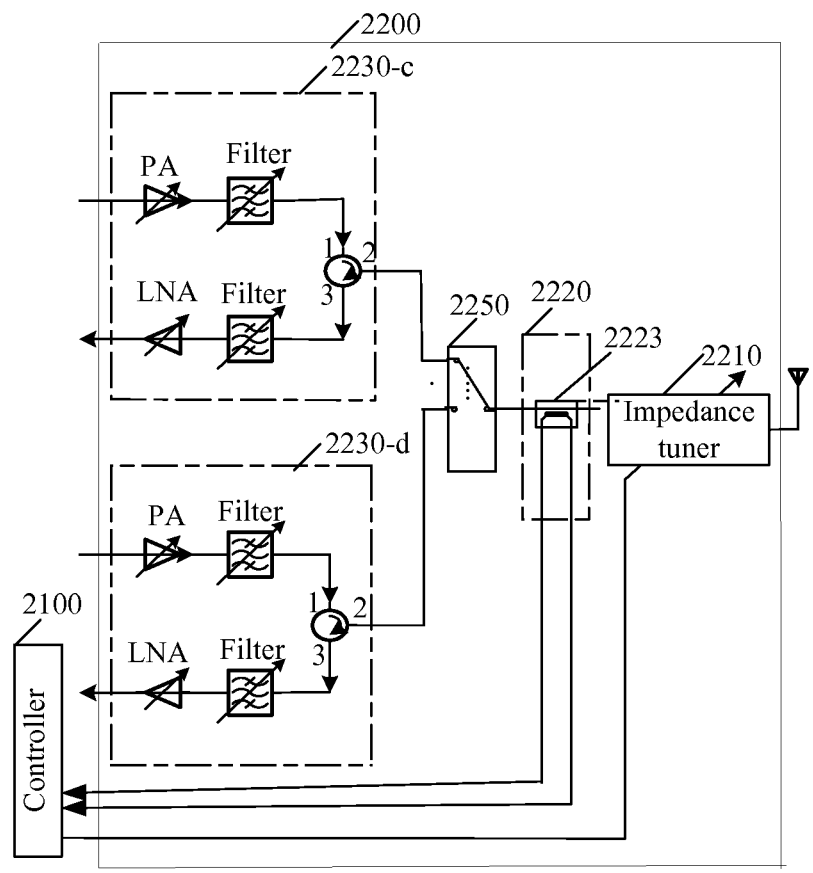
FIG. 10 is a schematic block diagram of a radio frequency circuit according to another embodiment of the present invention.

For example, as shown in FIG. 10, a duplexing module 2200 includes a transmitter-receiver unit 2230-*c*, a transmitter-receiver unit 2230-*d*, and a switch 2250, and a coupling unit 2220 is a directional coupler 2223. The switch 2250 may selectively transmit, to the directional coupler 2223, a second transmit signal output by either of the transmitter-receiver units 2230-*c* and 2230-*d*; the directional coupler 2223 uses a part of the second transmit signal, which is output by the switch 2250, as a third transmit signal, directly sends the third transmit signal to an impedance tuner 2210, and obtains, by means of coupling, a first coupling signal from the second transmit signal; in addition, the directional coupler 2223 uses a part of a first input signal, which is output by the impedance tuner 2210, as a second input signal, directly sends the second input signal to the switch 2250, and obtains, by means of coupling, a second coupling signal from the first input signal; and the switch 2250 selectively transmits the second input signal to either of the transmitter-receiver units 2230-*c* and 2230-*d*.

Similarly, the two transmitter-receiver units shown in FIG. 10 may support different bands. For example, the transmitter-receiver unit 2230-*c* may support a frequency range (for example, 3GPP LB 700 M-960 M), and the transmitter-receiver unit 2230-*d* may support another frequency range (for example, 3GPP HB 1700 M-2170 M, or UHB 2300 M-2700 M). If the duplexing module 2200 needs to work in a band, the transmitter-receiver unit supporting the band may be connected to the directional coupler 2223 using the switch 2250. The two transmitter-receiver units may also support different communications standards. For example, the transmitter-receiver unit 2230-*c* may support a 3G system, and the transmitter-receiver unit 2230-*d* may support a 4G system. If the duplexing module 2200 needs to work in a communications standard, the transmitter-receiver unit supporting the communications standard may be connected to the directional coupler 2223 using the switch.

Figure 11:
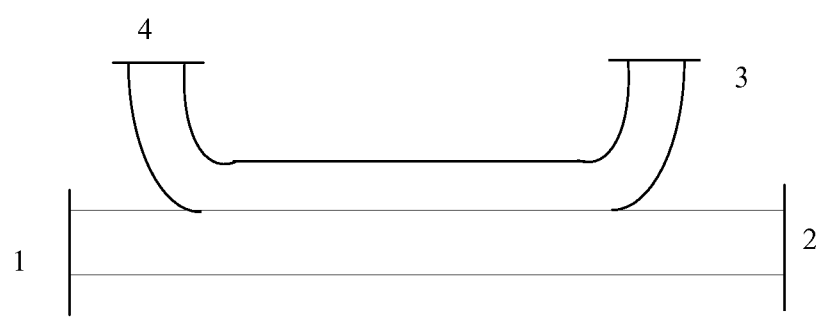
FIG. 11 is a schematic block diagram of a directional coupler according to another embodiment of the present invention.

Optionally, in the embodiment of the present invention, the directional coupler of the coupling unit 2220 may be referred to as a bi-directional directional coupler, the bi-directional directional coupler may have four ports, for example, as shown in FIG. 11. A signal may be input from a port 1, a coupling signal obtained by coupling the signal may be output from a port 3, and a remaining signal other than the coupling signal is output from a port 2; or a signal may be input from a port 2, a coupling signal obtained by coupling the signal may be output from a port 4, and a remaining signal other than the coupling signal is output from a port 1. For example, the second transmit signal according to the embodiment of the present invention may be input from the port 1, the third transmit signal may be output from the port 2, and the first coupling signal may be output from the port 3; and the first input signal may be input from the port 2, the second input signal may be output from the port 1, and the second coupling signal may be output from the port 4. It should be understood that, port IDs 1, 2, 3, and 4 of a directional coupler are used only for ease of clearer description, and should not be construed as limitation on the embodiment of the present invention.

Optionally, the directional coupler of the coupling unit 2220 according to the embodiment of the present invention may also be implemented using two unidirectional directional couplers.

Optionally, in the embodiment of the present invention, a circuit 2000 includes a plurality of duplexing modules 2200, the plurality of duplexing modules 2200 further includes a diplexer, the plurality of duplexing modules 2200 is separately connected to an antenna port using the diplexer, and the diplexer is configured to transmit, according to different bands, the first input signal to a duplexing module corresponding to a band of the first input signal.

Figure 12:
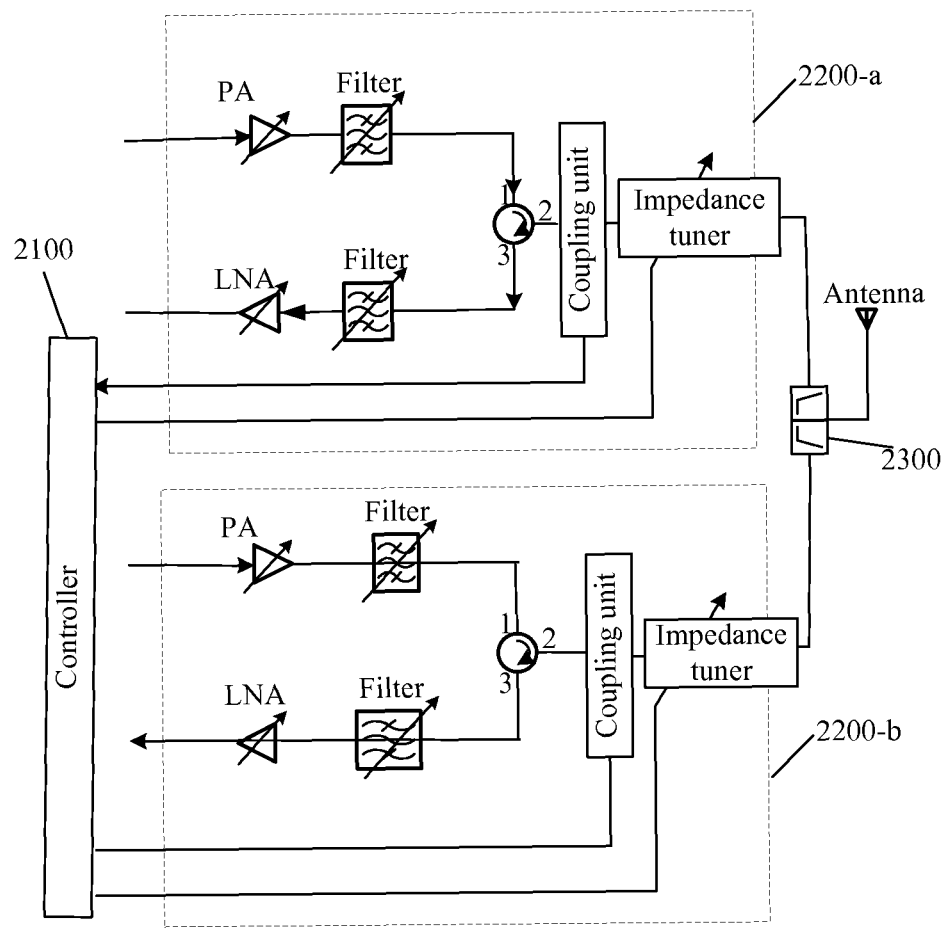
FIG. 12 is a schematic block diagram of a radio frequency circuit according to another embodiment of the present invention.

For example, as shown in FIG. 12, two duplexing modules 2200-a and 2200-b are connected to an antenna using a diplexer 2300, where a duplexing module 2200-a shown on an upper part of FIG. 12 may support a HB, and a duplexing module 2200-b shown on a lower part of FIG. 12 may support a LB. During specific operation, a broadband antenna simultaneously receives or transmits LB/HB signals, and using the diplexer 2230, transmits the LB signal to an LB channel (that is, the duplexing module shown on the lower part of FIG. 12), and transmits the HB signal to an HB channel (that is, the duplexing module shown on the upper part of FIG. 12), where the LB signal and the HB signal do not interfere with each other theoretically. Certainly, the radio frequency circuit shown in FIG. 12 may also be applied to a non-CA scenario.

It should be understood that, the radio frequency circuits 2000 shown in FIG. 7A and FIG. 7B to FIG. 12 are only specific implementation manners of the present invention, and should not be construed as limitation on a protection scope of the present invention.

It should be understood that, the radio frequency circuit shown in FIG. 8, FIG. 9, FIG. 10, or FIG. 12 includes a PA and a filter and the radio frequency receive path includes an LNA (and a filter), but the radio frequency transmit path and the radio frequency receive path according to the embodiment of the present invention may include another component, and should not be construed as limitation on the embodiment of the present invention; and all or a part of functions of the radio frequency transmit path and the radio frequency receive path according to the embodiment of the present invention, and the transceiver 4000 may also be integrated into one integrated circuit using an integrated circuit process; or in the embodiment of the present invention, all or a part of functions of the radio frequency receive path or the radio frequency transmit path may be integrated into the transceiver.

It should be understood that, the filter shown in FIG. 8, FIG. 9, FIG. 10, or FIG. 12 may be a band-pass filter supporting a fixed band, and certainly, may also be a tunable band-pass filter; in this case, a band supported by the radio frequency receive path may cover a relatively wide frequency range, or a band supported by the radio frequency transmit path may cover a relatively wide frequency range. Therefore, an area and cost of a radio frequency circuit may be further reduced.

Optionally, the radio frequency circuit 2000 in the embodiment of the present invention may be applied to a mobile terminal. Certainly, the radio frequency circuit 2000 according to the embodiment of the present invention may also be applied to another device, which is not limited in the embodiment of the present invention.

Therefore, because the circulator 2231 in the transmitter-receiver unit 2230 of the radio frequency circuit 2000 according to the embodiment of the present invention has a duplex function, and the radio frequency receive path 2233 and the radio frequency transmit path 2232 may have a filtering function, two functions, namely duplexing and filtering, are decoupled; in addition, because a working band of the circulator is a tunable or broadband band, a multimode and multi-frequency duplex function may be achieved, thereby reducing complexity, cost, and an area of a radio frequency circuit. A signal receive path and a signal transmit path according to the embodiment of the present invention may independently work at the same time, so that they may be compatible with both TDD and FDD modes, and complexity, cost, and an area of a radio frequency circuit may be further reduced.

In addition, the coupling unit 2220 according to the embodiment of the present invention may couple a transmit signal and an input signal to obtain the first coupling signal and the second coupling signal, and the controller 2100 may acquire impedance information of the antenna port according to the first coupling signal and the second coupling signal and perform impedance adjustment on the impedance tuner 2210 according to the impedance information of the antenna port, so that impedance matching may be achieved on a port that is of the circulator 2231 and connected to the antenna port, thereby ensuring an isolation of the circulator 2231 and making the isolation of the circulator 2231 keep unchanged when impedance of an antenna changes along with external environment. Therefore, an isolation between a receive path and a transmit path may be ensured.

An embodiment of the present invention further provides a mobile terminal, where the mobile terminal includes the foregoing radio frequency circuit and includes an antenna.

Figure 13:
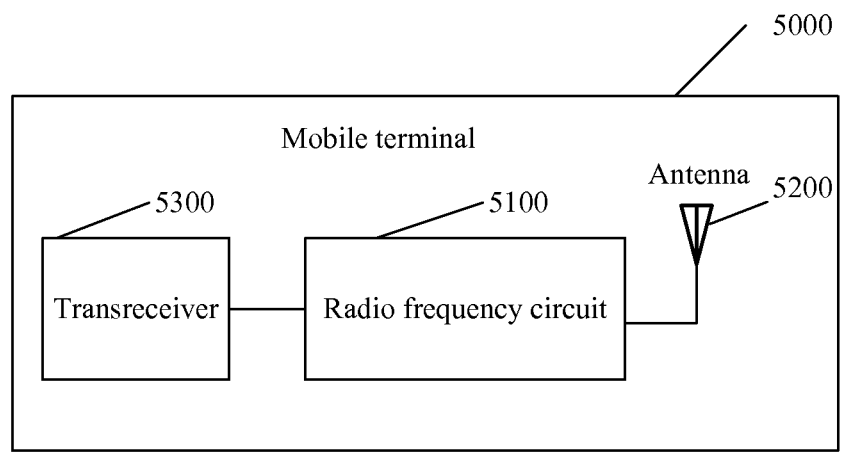
FIG. 13 is a schematic block diagram of a mobile terminal according to another embodiment of the present invention.

FIG. 13 is a schematic block diagram of a mobile terminal 5000 according to an embodiment of the present invention. As shown in FIG. 13, the mobile terminal 5000 includes a radio frequency circuit 5100 and an antenna 5200. The radio frequency circuit 5100 is coupled to an antenna port, which may also be referred to as an antenna feedpoint, of the antenna 5200, and a signal is received and transmitted through the antenna port. Optionally, as shown in FIG. 13, the mobile terminal 5000 may further include a transceiver.

The transceiver 5300 is configured to transmit a first transmit signal to a radio frequency transmit path of the radio frequency circuit 5100; and a radio frequency receive path of the radio frequency circuit 5100 is configured to transmit a third input signal to the transceiver 5300.

It should be understood that, in FIG. 13, the transceiver 5300 exists independently from the radio frequency circuit 5100, but in the embodiment of the present invention, a part of functions of the radio frequency circuit 5100 and the transceiver 5300 may be integrated into one integrated circuit using an integrated circuit process. For example, a controller and a transceiver are integrated into one integrated circuit, and/or a radio frequency receive path and a transceiver are integrated into one integrated circuit, and/or a radio frequency transmit channel and a transceiver are integrated into one integrated circuit. Optionally, in the embodiment of the present invention, all or a part of functions of a radio frequency receive path, and/or of a radio frequency transmit path, and/or of a controller may be integrated into a transceiver.

It should also be understood that, the radio frequency circuit 5100 may be corresponding to the foregoing radio frequency circuit 1000 or 2000, may achieve corresponding functions of the radio frequency circuit 1000 or 2000, and for brevity, details are not repeatedly described herein. The transceiver may be corresponding to the foregoing transceiver 3000 or 4000, may achieve corresponding functions of the transceiver 3000 or 4000, and for brevity, no detail is repeatedly described herein.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A radio frequency circuit comprising:
   a controller; and
   at least one duplexer coupled to the controller,
   wherein the duplexer comprises an impedance tuner coupled to the controller and at least one transceiver coupled to the impedance tuner,
   wherein the transceiver comprises a circulator, at least one radio frequency transmit path, at least one radio frequency receive path, a first directional coupler, and a second directional coupler,
   wherein the circulator comprises a first port coupled to the radio frequency transmit path, a second port coupled to the impedance tuner, and a third port coupled to the radio frequency receive path,
   wherein the first port, the second port, and the third port are arranged in sequence in a circular direction of the circulator,
   wherein the radio frequency transmit path is configured to:
     receive a first transmit signal;
     filter on the first transmit signal; and
     amplify the first transmit signal to obtain a second transmit signal,
   wherein the first directional coupler is configured to:
     receive the second transmit signal;
     use a part of the second transmit signal as a third transmit signal;
     directly send the third transmit signal to the circulator; and
     obtain, a first coupling signal from the second transmit signal,
   wherein the circulator is configured to:
     receive the third transmit signal through the first port; and
     output the third transmit signal through the second port,
   wherein the impedance tuner is configured to:
     transmit, to an antenna port, the third transmit signal; and
     transmit, to the second port of the circulator, a first input signal from the antenna port,
   wherein the circulator is further configured to:
     receive the first input signal through the second port; and
     send first input signal to the second directional coupler through the third port,
   wherein the second directional coupler is configured to:
     use a part of the first input signal as a second input signal;
     directly send the second input signal to the radio frequency receive path; and
     obtain a second coupling signal from the first input signal,
   wherein the radio frequency receive path is configured to filter on the second input signal to obtain a third input signal,
   wherein the circulator allows the radio frequency transmit path and the radio frequency receive path to work in duplex mode, and
   wherein the controller is configured to adjust impedance of the impedance tuner according to the first coupling signal and the second coupling signal so that impedance matching is achieved on the second port of the circulator.

2. The circuit according to claim 1, wherein the controller is further configured to:
   acquire impedance information of the antenna port according to the first coupling signal and the second coupling signal; and
   perform impedance adjustment on the impedance tuner according to the impedance information of the antenna port so that impedance matching is achieved on the second port of the circulator, and
   wherein the impedance information of the antenna port comprises a standing wave ratio that is of the antenna port and obtained according to a power of the first coupling signal and a power of the second coupling signal.

3. The circuit according to claim 2, wherein the controller is further configured to:
   acquire the impedance information of the antenna port according to the first coupling signal and the second coupling signal; and
   perform dynamic adjustment on the impedance of the impedance tuner according to the impedance information of the antenna port.

4. The circuit according to claim 1, wherein the transceiver comprises a plurality of the radio frequency transmit paths and a plurality of the radio frequency receive paths, wherein the transceiver further comprises a first switch and a second switch, wherein the first switch is configured to selectively transmit, to the first directional coupler, the second transmit signal, and wherein the second switch is configured to selectively transmit, to one radio frequency receive path of the radio frequency receive paths, the second input signal directly received from the second directional coupler.

5. The circuit according to claim 1, wherein the circuit comprises a plurality of the duplexers, wherein the circuit further comprises a diplexer, wherein the duplexers are separately coupled to the antenna port using the diplexer, and wherein the diplexer is configured to transmit, according to a band of the first input signal, the first input signal to a duplexer corresponding to a band of the first input signal.

6. The circuit according to claim 1, wherein the radio frequency transmit path comprises a power amplifier and a filter, and wherein the radio frequency receive path comprises a filter.

7. The circuit according to claim 6, wherein the radio frequency receive path further comprises a low-noise amplifier configured to amplify a signal that is filtered by the filter in the radio frequency receive path so as to obtain the third input signal.

8. The circuit according to claim 1, wherein the controller is further configured to:
   acquire impedance information of the antenna port according to the first coupling signal and the second coupling signal; and
   perform impedance adjustment on the impedance tuner according to the impedance information of the antenna port so that impedance matching is achieved on the second port of the circulator, and wherein the impedance information of the antenna port comprises a standing wave ratio that is of the antenna port and obtained according to a power of the first coupling signal and a power of the second coupling signal, and an impedance phase angle that is of the antenna port and obtained according to relative phases of the first coupling signal and the second coupling signal.

9. The circuit according to claim 1, wherein first input signal passes through the circulator only once when traveling from the impedance tuner to the second directional coupler.

10. A radio frequency circuit comprising:
a controller; and
at least one duplexer coupled to the controller,
wherein the duplexer comprises an impedance tuner coupled to the controller, a coupler coupled to the impedance tuner, and at least one transceiver coupled to the coupler,
wherein the transceiver comprises a circulator, at least one radio frequency transmit path, and at least one radio frequency receive path,
wherein the circulator comprises a first port coupled to the radio frequency transmit path, a second port coupled to the coupler, and a third port coupled to the radio frequency receive path,
wherein the first port, the second port, and the third port are arranged in sequence in a circular direction of the circulator,
wherein the radio frequency transmit path is configured to:
receive a first transmit signal;
filter on the first transmit signal; and
amplify the first transmit signal to obtain a second transmit signal,
wherein the circulator is configured to:
receive the second transmit signal through the first port; and
output the second transmit signal through the second port,
wherein the coupler is configured to:
receive the second transmit signal;
use a part of the second transmit signal as a third transmit signal;
directly send the third transmit signal to the impedance tuner; and
obtain a first coupling signal from the second transmit signal,
wherein the impedance tuner is configured to:
transmit, to an antenna port, the third transmit signal; and
transmit, to the coupler, a first input signal from the antenna port,
wherein the coupler is further configured to:
use a part of the first input signal as a second input signal;
directly send the second input signal to the circulator; and
obtain a second coupling signal from the first input signal,
wherein the circulator is further configured to:
receive the second input signal through the second port; and
send the second input signal to the radio frequency receive path through the third port, wherein the radio frequency receive path is configured to filter on the second input signal to obtain a third input signal, wherein the circulator allows the radio frequency transmit path and the radio frequency receive path to work in duplex mode, and wherein the controller is configured to adjust impedance of the impedance tuner according to the first coupling signal and the second coupling signal so that impedance matching is achieved on the second port of the circulator.

11. The circuit according to claim 10, wherein the controller is further configured to:
acquire impedance information of the antenna port according to the first coupling signal and the second coupling signal; and
perform impedance adjustment on the impedance tuner according to the impedance information of the antenna port so that impedance matching is achieved on the second port of the circulator, and
wherein the impedance information of the antenna port comprises a standing wave ratio that is of the antenna port and obtained according to a power of the first coupling signal and a power of the second coupling signal.

12. The circuit according to claim 11, wherein the controller is further configured to:
acquire the impedance information of the antenna port according to the first coupling signal and the second coupling signal; and
perform dynamic adjustment on the impedance of the impedance tuner according to the impedance information of the antenna port.

13. The circuit according to claim 10, wherein the transceiver comprises a plurality of the radio frequency transmit paths and a plurality of the radio frequency receive paths, wherein the transceiver further comprises a first switch and a second switch, wherein the first switch is configured to selectively transmit, to the circulator, the second transmit signal, and wherein the second switch is configured to selectively transmit, to one of the radio frequency receive paths, the second input signal.

14. The circuit according to claim 10, wherein the duplexer comprises a plurality of the transceivers, wherein the duplexer further comprises a third switch, wherein the coupler comprises a plurality of directional couplers, wherein each directional coupler separately corresponds to one transceiver, wherein the directional coupler is configured to:
obtain a first coupling signal from the second transmit signal;
use a part of the second transmit signal as a third transmit signal; and
directly send the third transmit signal to the third switch,
wherein the third switch is configured to selectively transmit, to the impedance tuner, the third transmit signal,
wherein the third switch is further configured to selectively transmit, to one of the directional couplers, the first input signal, and
wherein the directional coupler is further configured to:
use a part of the first input signal as a second input signal;
directly send the second input signal to the circulator of the transceiver corresponding to the directional coupler; and obtain a second coupling signal from the first input signal.

15. The circuit according to claim 10, wherein the duplexer comprises a plurality of the transceivers, wherein the duplexer further comprises a fourth switch, wherein the fourth switch is configured to:
selectively transmit, to the coupler, a second transmit signal; and
transmit, to one of the transceivers, the second input signal, and
wherein the coupler is a directional coupler.

16. The circuit according to claim 10, wherein the circuit comprises the duplexers, wherein the circuit further comprises a diplexer, wherein the duplexers are separately coupled to the antenna port using the diplexer, and wherein the diplexer is configured to transmit, according to different bands, the first input signal to a duplexer corresponding to a band of the first input signal.

17. The circuit according to claim 10, wherein the radio frequency transmit path comprises a power amplifier and a filter, and wherein the radio frequency receive path comprises a filter.

18. The circuit according to claim 17, wherein the radio frequency receive path further comprises a low-noise amplifier, and wherein the low-noise amplifier is configured to amplify a signal that is filtered by the filter in the radio frequency receive path so as to obtain the third input signal.

19. The circuit according to claim 10, wherein the controller is further configured to:
acquire impedance information of the antenna port according to the first coupling signal and the second coupling signal; and
perform impedance adjustment on the impedance tuner according to the impedance information of the antenna port so that impedance matching is achieved on the second port of the circulator, and
wherein the impedance information of the antenna port comprises a standing wave ratio that is of the antenna port and obtained according to a power of the first coupling signal and a power of the second coupling signal, and an impedance phase angle that is of the antenna port and obtained according to relative phases of the first coupling signal and the second coupling signal.

20. The circuit according to claim 10, wherein second input signal passes through the circulator only once when traveling from the coupler to the radio frequency receive path.

* * * * *

UNITED STATES PATENT AND TRADEMARK OFFICE
CERTIFICATE OF CORRECTION

PATENT NO.         : 9,853,802 B2
APPLICATION NO.    : 14/695553
DATED              : December 26, 2017
INVENTOR(S)        : Weinan Li et al.

It is certified that error appears in the above-identified patent and that said Letters Patent is hereby corrected as shown below:

In the Claims

Column 27, Lines 16-67, through Column 28, Lines 1-11, Claim 1 should read:
1. A radio frequency circuit comprising:
    a controller; and
    at least one duplexer coupled to the controller,
  wherein the duplexer comprises an impedance tuner coupled to the controller and at least one transceiver coupled to the impedance tuner,
  wherein the transceiver comprises a circulator, at least one radio frequency transmit path, at least one radio frequency receive path, a first directional coupler, and a second directional coupler,
  wherein the circulator comprises a first port coupled to the radio frequency transmit path, a second port coupled to the impedance tuner, and a third port coupled to the radio frequency receive path,
  wherein the first port, the second port, and the third port are arranged in sequence in a circular direction of the circulator,
    wherein the radio frequency transmit path is configured to:
        receive a first transmit signal;
        filter on the first transmit signal; and
        amplify the first transmit signal to obtain a second transmit signal,
    wherein the first directional coupler is configured to:
        receive the second transmit signal;
        use a part of the second transmit signal as a third transmit signal;
        directly send the third transmit signal to the circulator; and
        obtain a first coupling signal from the second transmit signal,
    wherein the circulator is configured to:
        receive the third transmit signal through the first port; and
        output the third transmit signal through the second port,
    wherein the impedance tuner is configured to:
        transmit, to an antenna port, the third transmit signal; and Signed and Sealed this
Thirtieth Day of January, 2018

Joseph Matal
*Performing the Functions and Duties of the*
*Under Secretary of Commerce for Intellectual Property and*
*Director of the United States Patent and Trademark Office* transmit, to the second port of the circulator, a first input signal from the antenna port,
wherein the circulator is further configured to:
receive the first input signal through the second port; and
send the first input signal to the second directional coupler through the third port,
wherein the second directional coupler is configured to:
use a part of the first input signal as a second input signal;
directly send the second input signal to the radio frequency receive path; and
obtain a second coupling signal from the first input signal,
wherein the radio frequency receive path is configured to filter on the second input signal to obtain a third input signal,
wherein the circulator allows the radio frequency transmit path and the radio frequency receive path to work in duplex mode, and
wherein the controller is configured to adjust impedance of the impedance tuner according to the first coupling signal and the second coupling signal so that impedance matching is achieved on the second port of the circulator.